United States Patent
Mcmurtry et al.

(10) Patent No.: US 12,502,712 B2
(45) Date of Patent: Dec. 23, 2025

(54) OPTICAL SCANNER FOR DIRECTING ELECTROMAGNETIC RADIATION TO DIFFERENT LOCATIONS WITHIN A SCAN FIELD

(71) Applicant: RENISHAW PLC, Wotton-under-Edge (GB)

(72) Inventors: David Roberts Mcmurtry, Dursley (GB); John Dardis, Minchinhampton (GB)

(73) Assignee: RENISHAW PLC, Wotton-under-Edge (GB)

( * ) Notice: Subject to any disclaimer, the term of this patent is extended or adjusted under 35 U.S.C. 154(b) by 507 days.

(21) Appl. No.: 18/008,601

(22) PCT Filed: Jul. 5, 2021

(86) PCT No.: PCT/GB2021/051698
§ 371 (c)(1),
(2) Date: Dec. 6, 2022

(87) PCT Pub. No.: WO2022/008885
PCT Pub. Date: Jan. 13, 2022

(65) Prior Publication Data
US 2023/0302538 A1    Sep. 28, 2023

(30) Foreign Application Priority Data
Jul. 6, 2020   (GB) ...................................... 2010315

(51) Int. Cl.
*B22F 10/31*   (2021.01)
*B22F 10/28*   (2021.01)
(Continued)

(52) U.S. Cl.
CPC .............. *B22F 10/31* (2021.01); *B22F 10/28* (2021.01); *B22F 12/45* (2021.01); *B29C 64/268* (2017.08); *B29C 64/386* (2017.08)

(58) Field of Classification Search
CPC .......... B22F 10/31; B22F 10/28; B22F 12/45; B22F 2999/00; B22F 12/49; B22F 12/90;
(Continued)

(56) References Cited

U.S. PATENT DOCUMENTS

| | | | |
|---|---|---|---|
| 5,430,666 A | 7/1995 | DeAngelis et al. | |
| 5,832,415 A | 11/1998 | Wilkening et al. | |

(Continued)

FOREIGN PATENT DOCUMENTS

| | | | |
|---|---|---|---|
| DE | 10 2013 208 651 A1 | 11/2014 | |
| EP | 2 186 625 A2 | 5/2010 | |

(Continued)

OTHER PUBLICATIONS

Dec. 11, 2020 Search Report issued in British Patent Application No. 2010315.6.

(Continued)

*Primary Examiner* — Michael J Brown
(74) *Attorney, Agent, or Firm* — Oliff PLC

(57) ABSTRACT

A method and apparatus for determining an alignment of an optical scanner for directing an electromagnetic beam to locations within a scan field. The method may include locating a reference element within the scan field of the optical scanner and controlling the optical scanner to cause the electromagnetic beam to be directed to a plurality of different points in the scan field, including at least one point on the reference element. Reflected electromagnetic radiation is detected. The method may include determining when the electromagnetic beam is directed to a reference position in the scan field given by the reference element from a (Continued)

comparison of an intensity of the detected electromagnetic radiation for the different points and determining a corresponding demand signal that causes the optical scanner to direct the electromagnetic beam to the reference position.

23 Claims, 18 Drawing Sheets

(51) Int. Cl.
  *B22F 12/45* (2021.01)
  *B29C 64/268* (2017.01)
  *B29C 64/386* (2017.01)
  *B33Y 50/00* (2015.01)
  *G05B 19/40* (2006.01)

(58) Field of Classification Search
  CPC ... B29C 64/268; B29C 64/386; B29C 64/153; Y02P 10/25; G05B 2219/37558; G05B 19/4015; B33Y 10/00; B33Y 50/00; B33Y 30/00
  USPC .......................................................... 700/98
  See application file for complete search history.

(56) References Cited

U.S. PATENT DOCUMENTS

| | | | |
|---|---|---|---|
| 6,483,596 | B1 | 11/2002 | Philippi et al. |
| 6,646,728 | B1* | 11/2003 | Tang ................... B23K 26/705 356/123 |
| 8,040,530 | B2 | 10/2011 | Cooper |
| 8,237,788 | B2 | 8/2012 | Cooper et al. |
| 8,666,142 | B2 | 3/2014 | Shkolnik et al. |
| 10,336,008 | B2 | 7/2019 | Perret et al. |
| 10,399,145 | B2 | 9/2019 | McMurtry et al. |
| 10,725,446 | B2 | 7/2020 | Mercelis |
| 10,850,326 | B2 | 12/2020 | Ashton et al. |
| 10,933,468 | B2 | 3/2021 | Jones et al. |
| 11,123,799 | B2 | 9/2021 | McMurtry et al. |
| 11,135,679 | B2 | 10/2021 | Van Vaerenbergh et al. |
| 11,192,294 | B2 | 12/2021 | Cooper et al. |
| 2009/0051935 | A1 | 2/2009 | Cooper |
| 2009/0060386 | A1 | 3/2009 | Cooper et al. |
| 2010/0125356 | A1 | 5/2010 | Shkolnik et al. |
| 2010/0292947 | A1 | 11/2010 | Buk |
| 2011/0223349 | A1 | 9/2011 | Scott |
| 2014/0348969 | A1 | 11/2014 | Scott |
| 2016/0082668 | A1 | 3/2016 | Perret et al. |
| 2016/0136730 | A1 | 5/2016 | Mcmurtry et al. |
| 2016/0236279 | A1 | 8/2016 | Ashton et al. |
| 2016/0303806 | A1 | 10/2016 | Mercelis |
| 2018/0345412 | A1 | 12/2018 | Van Vaerenbergh et al. |
| 2018/0354034 | A1 | 12/2018 | Vaes et al. |
| 2018/0370144 | A1 | 12/2018 | Revanur et al. |
| 2019/0022946 | A1 | 1/2019 | Jones et al. |
| 2019/0118481 | A1 | 4/2019 | Brown |
| 2019/0270161 | A1* | 9/2019 | Allenberg-Rabe ..... B33Y 10/00 |
| 2019/0329323 | A1 | 10/2019 | Mcmurtry et al. |
| 2020/0001526 | A1 | 1/2020 | Cooper et al. |
| 2020/0023585 | A1 | 1/2020 | Wiesner et al. |
| 2020/0338669 | A1 | 10/2020 | Shi |
| 2021/0023622 | A1 | 1/2021 | Pieger et al. |
| 2021/0039167 | A1 | 2/2021 | Ashton et al. |
| 2021/0146447 | A1 | 5/2021 | Jones et al. |
| 2022/0055291 | A1 | 2/2022 | Cooper et al. |

FOREIGN PATENT DOCUMENTS

| | | |
|---|---|---|
| EP | 3 730 234 A1 | 10/2020 |
| JP | 2009-187788 A | 8/2009 |
| WO | 94/15265 A1 | 7/1994 |
| WO | 2009/026520 A1 | 2/2009 |
| WO | 2010/007396 A1 | 1/2010 |
| WO | 2014/180971 A1 | 11/2014 |
| WO | 2014/199149 A1 | 12/2014 |
| WO | 2015/040433 A2 | 3/2015 |
| WO | 2015/083104 A1 | 6/2015 |
| WO | 2016/085334 A2 | 6/2016 |
| WO | 2017/085469 A1 | 5/2017 |
| WO | 2017/187147 A1 | 11/2017 |
| WO | 2019/197138 A1 | 10/2019 |
| WO | 2020/006260 A1 | 1/2020 |

OTHER PUBLICATIONS

Oct. 4, 2021 International Search Report issued in International Patent Application No. PCT/GB2021/051698.

Oct. 4, 2021 Written Opinion issued in International Patent Application No. PCT/GB2021/051698.

* cited by examiner

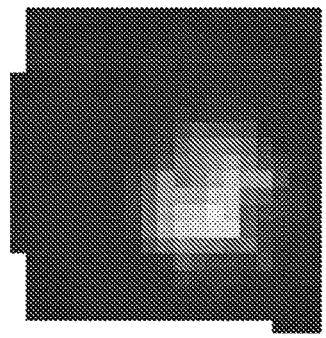 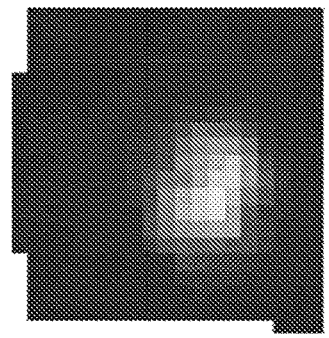 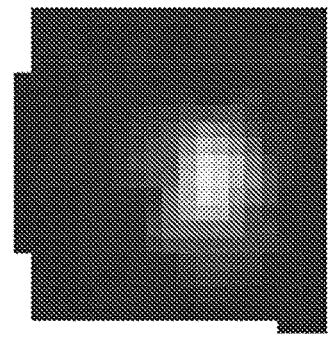
FIG. 19a        FIG. 19b        FIG. 19c
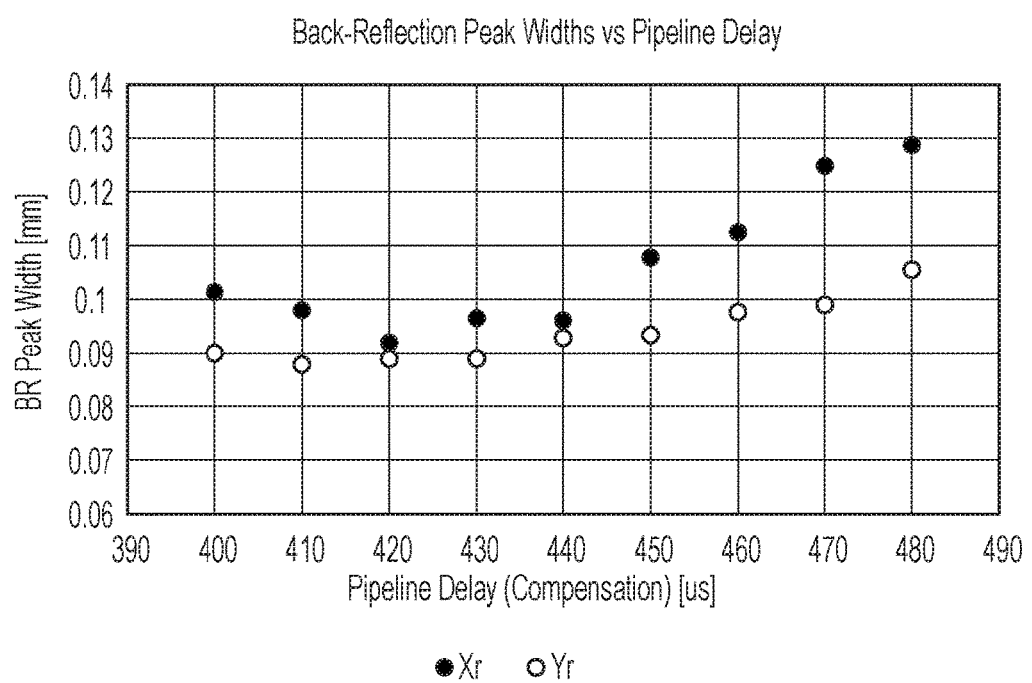
FIG. 20

OPTICAL SCANNER FOR DIRECTING ELECTROMAGNETIC RADIATION TO DIFFERENT LOCATIONS WITHIN A SCAN FIELD

FIELD OF INVENTION

This invention concerns improvements in or relating to an optical scanner for directing electromagnetic radiation to different locations within a scan field. The invention has particular, but not exclusive, application to determining alignment of such an optical scanner, in particular a scanner in an additive manufacturing apparatus. The invention has particular, but not exclusive, application to a laser-based powder bed fusion apparatus and more particularly, a powder bed fusion apparatus comprising multiple optical trains, each optical train for independently steering a laser beam.

BACKGROUND

Powder bed fusion apparatus produce objects through layer-by-layer solidification of a material, such as a metal powder material, using a high-energy beam, such as a laser beam. A powder layer is formed in a working plane across a powder bed contained in a build sleeve by lowering a build platform in the build sleeve to lower the powder bed, dosing a heap of powder adjacent to the lowered powder bed and spreading the heap of powder with a recoater across (from one side to another side of) the powder bed to form the layer. Portions of the powder layer corresponding to a cross-section of the workpiece to be formed are then solidified through irradiating these areas with the beam directed to required locations on the powder bed by an optical train. The beam melts or sinters the powder to form a solidified layer. After selective solidification of a layer, the powder bed is lowered by a thickness of the newly solidified layer and a further layer of powder is spread over the surface and solidified, as required.

In order to form the object as desired it is necessary that the optical train directs the laser beam to the demanded positions. To ensure that this is the case, the optical train is calibrated before the build commences and periodically checked to ensure that the optical train remains in the required alignment.

WO94/15265 discloses placing a Mylar sheet with a large number of square cells printed thereon on a target surface and marking each cell with the laser beam. The sheet is then converted into digital form by scanning with a conventional digital scanner and the location of the laser mark relative to the centroid of the cell is used to update the correction factors for that cell. Such a calibration is carried out periodically.

A limitation on the accuracy and repeatability of this process is the resolution of the scanner, typically about 48 um/pixel. Furthermore, an intensity and quality of the laser mark can vary across the working plane and, when used for calibrating a multi-laser system, between lasers, making image analysis prone to drop-outs. Typically, a number of iterations of the process must be carried out to achieve a desired accuracy and the laser firing for each iteration can take up to 40 mins. Accordingly, the process can be time consuming.

U.S. Pat. No. 5,832,415 discloses a method for calibrating the deflection control of a laser beam for a rapid prototyping system. A light-sensitive medium is exposed to a laser beam at predetermined positions for generating a test pattern. A video camera is progressively moved across the produced test pattern so as to produce corresponding pattern portions of the test pattern with the camera. An evaluation program is used for composing the digitized pattern portions to an overall pattern. The picture coordinates of the overall pattern are compared with the digitized coordinates of a photomechanically produced reference pattern. A correction table required for control of the scanner for deflecting the laser beam is modified on the basis of the comparison.

U.S. Pat. No. 6,483,596 discloses a method for calibrating the control of a radiation device in a rapid prototyping system, wherein a calibration plate is arranged at a defined position in the rapid prototyping system. The calibration plate has an upper side with a first region and second region separate from the first region. The first region is provided with optically detectable reference crosses and the second region has a medium which is sensitive to the radiation of the radiation device. A test pattern of crosses is produced by exposing the medium to the radiation at predetermined desired positions defined by position coordinate data. The first and second regions are digitised, for example by means of a pixel scanner, a video camera or a digital camera, and correction data is calculated from comparing the reference crosses and crosses of the test pattern.

EP2186625 discloses a method to correct for geometric distortion of digital light projectors used in a rapid prototyping system. A camera is used to view an uncompensated test pattern created by each digital light projector. Each uncompensated test pattern is compared with the ideal test pattern to generate a pattern correction map.

WO2014/180971 discloses a method of automatic calibration of a device for generative production of a three-dimensional workpiece comprising first and second scanners. On an applied layer of material or a target, a first test pattern is produced using the first scanner and a second test pattern is produced using the second scanner. The first and second test patterns may be a specific grating pattern with a specific lattice constant or a dot pattern. A calibrated camera is used to capture an image of the first and second test patterns and compare the first and second test patterns to a reference pattern stored in memory of a control device. The first and second scanners are calibrated such that deviations of the corresponding test patterns from the reference pattern fall below a desired value. The calibration method may comprise an auto-correlation method or matching method.

WO2015/040433 discloses the use of a calibrated artefact to generate a map of offsets for different locations of the laser beam focus across a working area. The calibrated artefact comprises an Invar plate having a number of features that can be identified through image analysis. Steerable optics are moved such that a corner at which four squares intersect is located at a centre of an image captured by an on-axis camera. The laser is fired to generate a mark on the artefact and an offset of the mark from an expected location is determined. The apparatus may also comprise a calibration artefact that remains in a place in the apparatus during the build. The laser beam may be focused on the calibration artefact between solidification of powder layers to determine using the on-axis camera whether the laser beam has drifted from its calibrated position during the build.

WO2015/083104 discloses a method and a device for calibrating at least one scanning system when producing an object by additive manufacturing, wherein the coordinates of one or several reference positions are measured in the relative coordinate system of each scanning system, after which the calibration of each of the scanning systems is adapted starting from the measured coordinates of the reference positions. A sensor is provided at each of the reference positions, the sensor making it possible to detect when the point if incidence of a ray is situated at the reference position.

WO2016/085334 discloses an apparatus and method for producing an object by means of additive manufacturing. The apparatus comprises a support for positioning the object in relation to the surface level of a bath of material. A registering device comprising a camera unit is provided for imaging a calibration element provided on or near the support. Furthermore, a control unit, connected to the registering device, is arranged for using a geometric characteristic of the calibration element obtained by the registering device for controlling the position of the electromagnetic radiation emitted by the solidifying device. Four or six calibration elements may be provided positioned on two opposed sides of the generally rectangular bath of material.

US2018/0345412 discloses a method of calibrating an optical system, wherein at least the scanning means are moved with respect to the build chamber from the production position to the calibration position and an actual value is measured for at least a parameter of the optical system and the actual value measured is compared to a selected value for said parameter. Next, the scanning means are returned to the production position and the optical system is adjusted such that the actual value of at least a parameter corresponds to the selected value of the corresponding parameter, where the product is subsequently manufactured. In the calibration position, the beam, by means of the scanning means, can strike a calibration device contains at least two, and preferably at least three, position sensors to measure the position of the point of incidence of the beam at different positions in a two-dimensional calibration plane.

US2010/0292947 A1 discloses a method and system for providing for reducing a positioning error for positioning a light beam either onto or from a workpiece. A vision detector is positioned with its optical axis in alignment with a path of the laser beam. By this arrangement, visible light from a workpiece, platform or calibration jig travels along the same path as the laser beam. A galvanometer positioning system is calibrated using images captured by the vision detector.

JP200826478 discloses a method of adjusting a laser beam machining apparatus having a laser light source, a galvanometer scanner, and a calibration table. The method includes: arranging on a target plane a scale plate having a plurality of scale marks, driving the galvanometer scanner and determining a correction value by observing each of the scale marks of the scale plate with a camera, and obtaining the calibration table of the camera for the galvanometer scanner.

US2019/270161 A1 and WO2019/197138 A1 disclose methods for calibrating a processing machine for producing three-dimensional components by irradiating powder layers, wherein the processing machine has a scanner device for positioning a laser beam in a processing field. The method comprises sweeping spherical retroreflectors with a laser beam.

WO2009/026520 A1 discloses systems and methods for calibrating a solid-imaging system. The system and methods scan a laser beam over a calibration plate having a non-scattering surface with a plurality of light-scattering fiducial marks in a periodic array.

US2020/023585 A1 discloses a device and a method for calibrating an irradiation system, wherein the irradiation system is used to manufacture a three-dimensional workpiece. The laser beam is scanned across a calibrating structure comprising two calibrating portions. The calibrating portions are in the form of depressions within a base region in the form of elongate recesses formed by cutting.

EP3730234 A1 discloses an optical sensor configured to detect a scattering signal of the laser beam generated by reflecting off of a plurality of calibration marks and the build platform. A computing device is configured to receive the scattering signal from the optical sensor and to align the laser heads such that the scattering signal aligns with the plurality of calibration marks and such that the laser heads align with each other. The calibration marks may include patterns such as a grid pattern, a pattern of dots and/or a checkerboard pattern.

WO2020/006260 A1 discloses a three-dimensional printing system for solidifying a photocurable resin in a layer-by-layer manner at a build plane. A scan module is configured to scan the light beam over a transparent plate positioned in the optical path between the scan module and a build plane. The transparent plate has at least one reflective feature in the optical path. A sensor is mounted above the glass plate and is positioned to receive light reflected from the reflective feature.

SUMMARY OF INVENTION

According to a first aspect of the invention there is provided a method of determining an alignment of an optical scanner for directing an electromagnetic beam to locations within a scan field, the method comprising locating a reference element within the scan field of the optical scanner; controlling the optical scanner to cause the electromagnetic beam to be directed to a plurality of different points in the scan field, including at least one point, and preferably a plurality of points, on the reference element; detecting reflected electromagnetic radiation; determining when the electromagnetic beam is directed to a reference position in the scan field given by the reference element from a comparison of an intensity of the detected electromagnetic radiation for the different points; and determining a corresponding demand signal that causes the optical scanner to direct the electromagnetic beam to the reference position.

The method of determining an alignment of the optical scanner may allow use of a photodetector for detecting the reflected electromagnetic radiation, such as a photodiode, that integrates the intensity across a field of view of the sensor, rather than a more costly and complex spatial detector, such as a camera or position sensitive detector (PSD). Spatial resolution of the method is achieved by repositioning of the electromagnetic beam by the optical scanner, such as by scanning, for example raster scanning, rather than by a spatial resolution of the detector. This may resolve issues with camera- or PSD-based methods, such as a requirement to align and/or determine an alignment between the image captured by the camera and the electromagnetic beam and distortion of the image through an optical train, for example as a result of focusing optics and/or a beam splitter.

The method may comprise detecting the reflected electromagnetic radiation with an on-axis photodetector mounted to detect electromagnetic radiation travelling back along an optical train used to deliver the electromagnetic beam.

The electromagnetic beam may be a laser beam delivered from a fibre-laser and the photodetector may be arranged to detect electromagnetic radiation travelling backwards through a delivery fibre or beam delivery optic of the fibre-laser. In this way, the photodetector may detect light at an excitation wavelength of the electromagnetic beam, such as a laser wavelength, that is reflected to a beam delivery optics of the optical fibre along the same path as the electromagnetic beam is delivered to the working surface. Accordingly, separate alignment of the beam delivery optic and the photodetector with an optical axis of an optical train of the optical scanner is not required.

The method may comprise directing electromagnetic radiation travelling backward in the optical fibre, such as in material surrounding a delivery optical fibre core of the optical fibre, to the photodetector. The electromagnetic radiation travelling backward in the optical fibre may be directed to the photodetector by a splitter which removes electromagnetic radiation travelling backward, for example in coating material of the optic fibre surrounding the delivery optical fibre core. The splitter may be integrated into a delivery fibre or beam delivery optic of the fibre-laser. The splitter may comprise a cladding mode stripper which directs electromagnetic radiation in the coating material to the photodetector. The splitter may comprise a detector optical fibre core in optical contact with the delivery optical fibre core, wherein the delivery core and the detector optical fibre core are surrounded by a common coating material, the second optical fibre core directed towards the photodetector.

The method may comprise a method of calibrating the optical scanner, comprising calculating a calibration map for the optical scanner from the corresponding demand signal and the reference position. The method may comprise a method for validating the alignment of the optical scanner, comprising determining whether there is an offset between the reference position and a demand position corresponding to the corresponding demand signal.

The reference element may comprise a reflective surface irradiated by the electromagnetic radiation. The reflective surface of the reference element may be at an interface between the gaseous atmosphere and the reference element. Preferably, the reference element is opaque to the electromagnetic radiation. The reflective surface may provide high specular reflection at a wavelength of the electromagnetic beam, for example the reflective surface may provide greater than 50%, preferably greater than 60%, more preferably greater than 70% and most preferably greater than 80% specular reflection at a wavelength of the electromagnetic beam. The amount of specular reflection achieved by the reflective surface may be measured by a glossmeter. To achieve such a high specular reflection, the reflective surface may be a polished reflective surface, such as a metal polished surface.

The method may comprise determining when the electromagnetic beam is directed to a reference position in the scan field given by the reference element from a change in the intensity of the detected electromagnetic radiation for different positions of the electromagnetic beam on the reference element. The method may comprise determining when the electromagnetic beam is directed to the reference position from when an intensity of the detected electromagnetic radiation is at a maxima, for example when the electromagnetic beam is at normal incidence to a circular or spherical surface of the reference element. The method may comprise determining when the electromagnetic beam is directed to the reference position from when an intensity of the detected electromagnetic radiation is at a maxima from the plurality of points on the reference element. In this way, the reference position is not defined just by when an intensity of detected radiation changes between the electromagnetic beam pointing away from and at the reference element but also from a change in intensity as the electromagnetic beam is directed to different points on the reference element. A curve may be fitted to the intensity of the detected radiation and the corresponding demand signal is the demand signal that causes the optical scanner to direct the electromagnetic beam to a position on the reference element that results in a peak intensity. This may be because the reflective surface of the reference element has a shape such that an amount of electromagnetic radiation of the electromagnetic beam retroreflected from the reflective surface is dependent on an angle of incidence of the electromagnetic beam to the reflective surface. The reflective surface may be arranged such that, if the electromagnetic beam hits the reflective surface away from normal incidence, the electromagnetic beam is reflected away from the optical scanner and an intensity of detected reflected radiation is relatively small compared to an intensity of detected reflected radiation when the electromagnetic beam is at normal incidence to the reflective surface. Accordingly, the reference element is not a retroreflector as the reference element rarely returns the reflected light back to its source. Retroreflectors reflect radiation back to its source with minimum scattering over a wide range of angles of incidence.

Using the principle of back-reflected specular reflection, where the light is efficiently reflected at an equal but opposite angle, may result in a higher detected signal and improved spatial selectivity. Higher detected signals may result in signals with higher signal to noise ratios.

Preferably, the reflective surface provides substantially uniform reflection of the electromagnetic beam across its extent. In other words, there is substantially no modulation to the surface reflectivity of the reflective surface. It is not necessary for the reflective surface to provide such changes in reflectivity because the angle of incidence of the electromagnetic beam to the curved reflective surface provides sufficient change in the detected signal.

The reference element may comprise a metal sphere. A metal sphere may have high tolerance to damage caused by the electromagnetic beam allowing the scanner to be used with an electromagnetic beam closer to or at processing powers (e.g. powers used to melt metal powder or machine metal parts), ensuring that the thermal state of the scanners during calibration closely matches the thermal state during processing/building.

The reference element may comprise a circular or spherical surface such that when the electromagnetic beam is directed at a centre of a circle or sphere, as defined by the circular or spherical surface, the electromagnetic beam is at normal incidence to the circular or spherical surface. In this way, when the electromagnetic beam is directed at the centre of the circle or sphere, as defined by the circular or spherical surface, the greatest proportion of the electromagnetic radiation is retroreflected back along a path of the electromagnetic beam. Accordingly, by analysing a change in intensity of the detected signals it is possible to identify when the electromagnetic beam is directed at the centre of the circle or sphere, as defined by the circular or spherical surface. By locating the centre at a reference position within the scan field, such as a reference position in the working plane, it is possible to compare the demand position which causes the electromagnetic beam to be directed to this reference position to the reference position and determine whether there is an offset between the two.

In the case wherein the optical scanner is arranged to direct the electromagnetic beam to a working plane, all points on the circular or spherical surface of the reference element intersected by a plane perpendicular to the working plane are all at the same distance, r, from the centre. The centre may lie in the working plane.

It will be understood that the term "circular or spherical surface" as used herein includes a surface that forms a complete circle or sphere and a surface that forms a fraction of a circle or sphere. Furthermore, "circular or spherical surface" includes concave as well as convex surfaces and hence includes "inner" surfaces of an incomplete circle or sphere. The reference element may comprise a ball (for example, a sphere) or a fraction of a sphere such as a hemisphere or shape having a circular surface such as a cylinder, a hemicylinder of another fraction of a cylinder, torus, hemi-torus or other fraction of a torus. An advantage of a spherical rather than circular surface is that the spherical surface will locate the electromagnetic beam to a point in two-dimensions, whereas a non-spherical circular surface may only locate the electromagnetic beam in one-dimension.

The optical scanner may be arranged for directing the electromagnetic beam to locations on a working plane and the reference element may be located such that a centre of a sphere, as defined by the spherical surface, is located in the working plane.

The reference element may be part of a calibration artefact, wherein the reference position is a predetermined position of the reference element on the calibration artefact. For example, the reference position may be a position relative to a locating feature of the calibration artefact, such as a kinematic mount, which locates the calibration artefact in apparatus comprising the optical scanner, a datum or another reference element of the calibration artefact.

The method may comprise locating a plurality of reference elements in the scan field. The plurality of reference elements may comprise an array of reference elements and the reference position is a position within a common plane, e.g. a calibration plane, relative to the other reference elements, for example as part of the calibration artefact. The plurality of reference elements may comprise an array of reference elements, each reference element comprising a circular or spherical surface, wherein the centres as defined by the circular or spherical surfaces, lie in a common plane. The method may comprise locating the array of reference elements such that the common plane is substantially coincident with the working plane, for example, within +/−100 μm of the working plane.

The reference position may be determined using a surface sensing probe, such as a touch trigger or scanning surface sensing probe mounted on a coordinate positioning machine, such as a coordinate measuring machine (CMM) or a machine tool. The calibration artefact is removably insertable into the apparatus comprising the optical scanner such that it can be placed in the working plane of the optical scanner between operations, such as between additive manufacturing builds.

A radius of curvature of the spherical surface may between $z_R$ and $4z_R$, and preferably $2z_R$ and $4z_R$, wherein $z_R$ is the Rayleigh length of the electromagnetic beam given by:

$$z_R = \frac{(\pi \cdot \omega_0)}{\lambda}, \quad (1)$$

wherein $\omega_0$ is the beam radius at focus and $\lambda$ is the wavelength of the electromagnetic beam. At focus, the wave-fronts of a focused electromagnetic beam act as a plane wave and the radius of curvature is infinite. However, as one moves away from focus, the wave-fronts become curved before quickly becoming planar. Accordingly, to obtain adequate reflection of the electromagnetic beam close to but away from focus, it is desirable that the spherical surface of the reference element substantially corresponds to the curvature of the wave-front at that point. It is believed that spherical surfaces have a radius of curvature of the spherical surface between $z_R$ and $4z_R$, and preferably $2z_R$ and $4z_R$, will reflect the electromagnetic beam adequately.

For a Nd-YAG laser operating at 1064 nm, the radius of curvature may be between 5 mm and 10 mm, and preferably 6 mm.

The method may comprise relocating the reference element in the scan field, for example within the working plane, from a first location to a second location and carrying of the method steps described above for both the first and second locations. The first and second locations may be spaced apart by less than a width of the reference element in a direction in which the reference element is relocated. When the plurality of reference elements is in the second location, a one of the reference elements may be spaced apart by less than a width of the reference element from the or another reference element when the plurality of reference elements is in the first location. The first and second locations may be defined by two sets of kinematic mounts which define two repeatable positions for the reference element. In this way, a density of data points can be greater than a density of the reference elements. Reducing a width of the reference element below a certain size may be restricted by the need of the curvature of the spherical surface to substantially correspond to that of the wave front of the electromagnetic beam.

The method may comprise raster scanning the or each reference element twice, first with unidirectional or bidirectional scanning of scan lines extending in a first direction and second with unidirectional or bidirectional scanning of scan lines extending in a second direction transverse to the first direction. The second direction may be perpendicular to the first direction. A density of data points along a direction of the scan lines may be higher than perpendicular to the scan lines because the spacing between data collection points along the scan line may be smaller than the spacing between scan lines. By scanning the or each reference element in two directions, one transverse, such as perpendicular, to the other, the density of data points is increased. The method may comprise raster scanning the or each reference element one or more further times with unidirectional or bidirectional scanning of scan lines extending in a one or more further directions transverse to the first and second directions. In a preferred embodiment, the or each reference element is raster scanned at least four times, each one in a different direction, for example 45 degrees apart.

A laser power used for scanning the reference element may be lower than an operating laser power used for carrying out operations, such as an additive manufacturing build, after determining an alignment of an optical scanner.

The method may comprise carrying out the above method for a plurality of optical scanners of the same apparatus, wherein the scan fields of the optical scanners overlap and the same reference element is used for calibrating multiple ones of the plurality of scanners. In this way, an alignment of each optical scanner is checked with respect to the same reference position and an alignment of the optical scanners to each other can be checked/validated.

The or each optical scanner may comprise at least one movable optical element for steering the electromagnetic beam to different locations within the scan field. The optical element may be a mirror mounted for rotation about an axis. Rotation of the mirror may be driven by a galvanometer.

The optical scanner or the plurality of optical scanners may comprise part of an additive manufacturing apparatus in which an object is built in a layer-by-layer manner by successively, forming a layer of powder and selectively irradiating the layer with the electromagnetic beam to consolidate regions of the layer. The powder layers may be formed in the working plane. The reference element may be mounted in the apparatus such that the optical scanner can direct the electromagnetic radiation onto the reference element when powder is present in the additive manufacturing apparatus. For example, the reference element may be mounted to be movable over the powder layer, such as on a recoater for forming the layers of powder, or at a location fixed relative to the powder layer such as to a side of the powder bed. In the latter case, the reference element may be mounted above the working plane of the powder bed such that the reference element is not covered by the powder, for example, the reference element may be held above the working plane on a stalk or column.

According to a second aspect of the invention there is provided an apparatus comprising an optical scanner for directing an electromagnetic beam to locations within a scan field, a detector for detecting reflected electromagnetic radiation, and a controller arranged to generate demand signals for the optical scanner to cause the optical scanner to direct the electromagnetic beam to a plurality of different points in a scan field in which a reference element is located, including at least one point, and preferably a plurality of points, on the reference element; receive detector signals from the detector; determine from the detector signals when the electromagnetic beam is directed to a reference position in the scan field given by the reference element from a comparison of an intensity of the detected signals for the different points; and determine a corresponding demand signal that causes the optical scanner to direct the electromagnetic beam to the reference position.

The apparatus may comprise a fibre-laser and the photodetector may be arranged to detect electromagnetic radiation travelling backwards through a delivery fibre or beam delivery optic of the fibre-laser. For example, the apparatus may comprise a splitter arranged to remove electromagnetic radiation travelling backward in the optical fibre and direct the electromagnetic radiation to the photodetector. The optical scanner may comprise at least one movable optical element and the photodetector is arranged to detect electromagnetic radiation reflected to the photodetector via the at least one movable optical element along the same path as the electromagnetic beam is delivered to the working surface.

The apparatus may comprise the reference element. The reference element may be mounted in the apparatus such that the optical scanner can direct the electromagnetic radiation onto the reference element when powder is present in the additive manufacturing apparatus. For example, the reference element may be mounted to be movable over the powder layer, such as on a recoater for forming the layers of powder, or at a location fixed relative to the powder layer such as to a side of the powder bed. In the latter case, the reference element may be mounted above the working plane of the powder bed such that the reference element is not covered by the powder, for example, the reference element may be held above the working plane on a stalk or column.

According to a third aspect of the invention there is provided a data carrier having instructions thereon which, when executed by a controller of an apparatus comprising an optical scanner for directing an electromagnetic beam to locations within a scan field and a detector for detecting reflected electromagnetic radiation cause the controller to generate demand signals for the optical scanner to cause the optical scanner to direct the electromagnetic beam to a plurality of different points in a scan field in which a reference element is located, including at least one point, and preferably a plurality of points, on the reference element; receive detector signals from the detector; determine from the detector signals when the electromagnetic beam is directed to a reference position in the scan field given by the reference element from a comparison of an intensity of the detected signals for the different points; and determine a corresponding demand signal that causes the optical scanner to direct the electromagnetic beam to the reference position.

The instructions when executed by the controller may cause the controller to determine when the electromagnetic beam is directed to the reference position from when an intensity of the detected electromagnetic radiation is at a maxima, for example when electromagnetic radiation is at normal incidence to the surface of the reference element.

The instructions when executed by the controller may cause the controller to determine a map mapping the demand signals to positions within a scan field.

The instructions when executed by the controller may cause the controller to determine whether there is an offset between the reference position and a demand position corresponding to the corresponding demand signal.

According to a fourth aspect of the invention there is provided a data carrier having instructions thereon which, when executed by a processor causes the processor to receive detector signals generated by a detector when an optical scanner directs an electromagnetic beam to a plurality of different points in a scan field in which a reference element is located; determine from the detector signals when the electromagnetic beam is directed to a reference position in the scan field given by the reference element from a comparison of an intensity of the detected signals; and determine a corresponding demand signal that causes the optical scanner to direct the electromagnetic beam to the reference position.

According to a fifth aspect of the invention there is provided a calibration artefact of an optical scanner, the calibration artefact comprising a plurality of reference elements, each reference element having a circular surface, wherein the centre of a circle defined by each circular surface is located within a common plane.

A radius of curvature of the spherical surface may between $z_R$ and $4z_R$, and preferably $2z_R$ and $4z_R$, wherein $z_R$ is the Rayleigh length of the electromagnetic beam given by:

$$z_R = \frac{(\pi \cdot \omega_0)}{\lambda} \quad (1)$$

wherein $\omega_0$ is the beam radius at focus and $\lambda$ is the wavelength of the electromagnetic beam. At focus, the wave-fronts of a focused electromagnetic beam act as a plane wave and the radius of curvature is infinite. However, as one moves away from focus, the wave-fronts become curved before quickly becoming planar. Accordingly, to obtain adequate reflection of the electromagnetic beam close to but away from focus, it is desirable that the spherical surface of the reference element substantially corresponds to the curvature of the wave-front at that point. It is believed that spherical surfaces have a radius of curvature of the spherical surface between $z_R$ and $4z_R$, and preferably $2z_R$ and $4z_R$, will reflect the electromagnetic beam adequately.

According to a sixth aspect of the invention there is provided an additive manufacturing apparatus comprising a fibre-laser for generating a laser beam comprising a fibre optic, an optical scanner for directing the laser beam from an end of the fibre optic to a plurality of locations on a working plane, a photodetector and a splitter for removing electromagnetic radiation travelling backwards in the optical fibre and directing the electromagnetic radiation to the photodetector.

The splitter may be arranged to split electromagnetic radiation travelling backwards in coating material of the optical fibre surrounding a delivery optical fibre core. The splitter may comprise a cladding mode stripper which directs electromagnetic radiation in the coating material to the photodetector. The splitter may comprise a detector optical fibre core in optical contact with the delivery optical fibre core, wherein the delivery core and the detector optical fibre core are surrounded by a common coating material, the second optical fibre core arranged to direct electromagnetic radiation towards the photodetector.

According to a seventh aspect of the invention there is provided an additive manufacturing method comprising detecting with a photodetector integrated into a fibre-laser, electromagnetic radiation emitted from a powder bed in which material is consolidated using an electromagnetic beam generated by the fibre-laser, wherein the electromagnetic beam is directed to different positions on the powder bed by at least one movable optical element of an optical scanner; and correlating each detector signal generated by the photodetector to a position of the optical element or a demand signal which causes movement of the movable optical element.

According to an eighth aspect of the invention there is provided a data carrier having instructions thereon which, when executed by a processor causes the processor to receive detector signals generated by a photodetector integrated into a fibre-laser of an additive manufacturing apparatus, the photodetector detecting electromagnetic radiation emitted from a powder bed in which material is consolidated using an electromagnetic beam generated by the fibre-laser, wherein the electromagnetic beam is directed to different positions on the powder bed by at least one movable optical element of an optical scanner; and correlate each detector signal from the photodetector to a position of the optical element or a demand signal which causes movement of the movable optical element.

According to a ninth aspect of the invention there is provided a method of determining a signal delay in a processing apparatus comprising an optical scanner for directing an electromagnetic beam to locations within a scan field and a photodetector for detecting radiation reflected along an optical path of the electromagnetic beam, the method comprising locating a reference element within a scan field of the optical scanner; controlling the optical scanner to cause the electromagnetic beam to be directed to a plurality of different points on the reference element; detecting reflected electromagnetic radiation using the photodetector; and determining the signal delay from photodetector signals generated by the photodetector and a time as which the photodetector signals are recorded.

The reference element may have a known geometrical property; and, for each candidate signal delay of a plurality of candidate signal delays, associating each photodetector signal with a coordinate position defined by a beam position signal temporally offset from the photodetector signal by the candidate signal delay and determining a geometrical property of a resultant spatial representation of the reference element formed from the photodetector signals; and determining the signal delay to be the candidate signal delay that most closely reproduces the known geometrical property.

The beam position signal may be a demand beam position signal sent to the optical scanner by a controller and the signal delay is a delay between the controller issuing the demand beam position signal and a photodetector signal for that beam position being recorded, for example by the controller. The controller may record a time at which each demand position is issued and a time at which each photodetector signal is received and apply the signal delay to determine which demand position to associate with which photodetector signal. The beam position signal may be a measured position signal, for example a position of a steering element of the optical scanner, and the signal delay is a delay between a controller recording the measured position signal and the controller recording a photodetector signal for that beam position.

The known geometrical property may be a feature of a profile of the reference element, such as a ratio of length to width of the shape. In the case where the profile is an ellipse, such as a circle, the ratio may be a ratio of major and minor axis of the ellipse. For example, the reference element may comprise a circular profile and the ratio of the major and minor axis may be 1:1. The method may comprise determining a ratio of the length and width of the representation of the reference element formed from the photodetector signals for each candidate signal delay and determining which candidate signal delay results in a ratio closest to the known ratio of the reference element. However, it will be understood that the geometric property may be a different geometric property that defines a profile, such as an angle of a vertex or angles of a set of vertices, lengths of one or more lines or ratios of the angles of such vertices or the lengths of the lines.

According to a tenth aspect of the invention there is provided an apparatus comprising an optical scanner for directing an electromagnetic beam to locations within a scan field, a photodetector for detecting reflected electromagnetic radiation, and a controller arranged to generate demand signals for the optical scanner to cause the optical scanner to direct the electromagnetic beam to a plurality of different points on a reference element within the scan field; receive detector signals from the photodetector; and determine the signal delay from photodetector signals generated by the photodetector and a time as which the photodetector signals are recorded by the controller.

The reference element may have a known geometrical property; and the controller may be arranged to, for each candidate signal delay of a plurality of candidate signal delays, associate each photodetector signal with a coordinate position defined by a beam position signal temporally offset from the photodetector signal by the candidate signal delay and determine a geometrical property of a resultant representation of the reference element formed from the photodetector signals; and determine an actual signal delay to be the candidate signal delay that most closely reproduces the known geometrical property.

According to a eleventh aspect of the invention there is provided a data carrier having instructions thereon which, when executed by a processor, cause the processor to receive photodetector signals generated by a photodetector of an apparatus comprising an optical scanner for directing an electromagnetic beam to locations within a scan field, the photodetector for detecting reflected electromagnetic radiation, the photodetector signals generated when the electromagnetic beam is directed to a plurality of different points on a reference element within the scan field; and determine the signal delay from photodetector signals generated by the photodetector and a time as which the photodetector signals are recorded.

The reference element may have a known geometrical property; and instructions may cause the controller to, for each candidate signal delay of a plurality of candidate signal delays, associate each photodetector signal with a coordinate position defined by a beam position signal temporally offset from the photodetector signal by the candidate signal delay and determine a geometrical property of a resultant representation of the reference element formed from the photodetector signals; and determine an actual signal delay to be the candidate signal delay that most closely reproduces the known geometrical property.

According to a twelfth aspect of the invention there is provided a method of checking apparatus comprising a plurality of scanners, each optical scanner for directing a corresponding electromagnetic beam to locations on a working plane, the method comprising determining whether coordinate positions of a first and second scanners of the plurality of scanners are aligned at the working plane; controlling each of the first and second scanners to direct the corresponding electromagnetic beam to a datum position within the apparatus; determining for each of the first and second scanners whether a demand position that causes the corresponding electromagnetic beam to be directed to the datum position is different to an expected demand position; and generate an output signal indicative of a shift in the working plane relative to calibration planes of the first and second scanners if the demand positions for both the first and second scanners correspond to the expected demand positions but the first and second scanners are not aligned at the working plane.

The electromagnetic beams of the optical scanners can become misaligned at the working plane because of a relative shift in the calibration planes of the optical scanners and/or because of a shift in the working plane relative to the working plane. Relative alignment of the optical scanners can be determined by using an on-axis position sensitive detector (PSD) or camera within at least one of the optical scanners, for example, using the method as described in WO2017/187147 A1, which is incorporated herein in its entirety by reference. Directing the corresponding electromagnetic beam to the datum position may comprise scanning the electromagnetic beam across a datum element in the apparatus, for example as described herein with reference to the first aspect of the invention. Directing the corresponding electromagnetic beam to the datum position allows one to determine whether it is a relative shift in the calibration planes that has caused the misalignment (in which case, the demand positions that causes the electromagnetic beams to be directed to the datum position will have changed) or whether it is a shift in the working plane (in which case, the demand positions that cause the electromagnetic beams to be directed to the datum position will remain the same).

At least the first scanner may comprise an on-axis position sensitive detector or camera for detecting a position of a feature within a field of view of the optical train, and determining whether the coordinate positions of the first and second scanners are aligned at the working plane may comprise controlling the first and second scanners such that a spot of the corresponding electromagnetic beam or a feature formed by the corresponding electromagnetic beam of the second scanner is within the field of view of the first scanner and determining a relative alignment of the coordinate positions of the first and second scanners from a position of the spot or the feature within the field of view as determined using the on-axis position sensitive detector or camera. The electromagnetic beam or a feature formed by the corresponding electromagnetic beam of the second scanner may fall within the field of view of the first scanner during the build and hence, it may not be necessary to direct the first and second scanners to additional positions beyond those required to complete the build in order to achieve the condition required for determining the relative alignment of the optical scanners.

The datum position may be provided by a datum element as described above. For example, the datum element may comprise a circular or spherical surface, such as a surface of a ball.

Each of the optical scanners may comprise an on-axis photodetector (for scanners comprising a PSD or camera, in addition to the PSD or camera) for detecting when the corresponding electromagnetic beam is directed to the datum position, for example a photodetector as described above with reference to the first aspect of the invention.

The method may comprise adjusting a position of a recoater that forms a powder layer relative to a build platform that supports a powder bed formed from the powder layers in response to the output signal. For example, if the output signal indicates that the coordinate positions of the electromagnetic beams of the first and second scanners are misaligned at the working plane but the positions of the calibration planes of these scanners remains unchanged from a previous calibration, for example carried out using a calibration artefact as described herein, it can be deduced that the misalignment is caused by a change in the location of the working plane. This may be because of wear of the recoater, thermal expansion of the build platform and/or a z-axis on which the build platform is mounted or inaccuracies in the movement of the build platform and/or recoater during the build. A correction to be applied to a relative positioning of the build platform and/or recoater may be determined using triangulation based on the relative positions of the electromagnetic beam spots in the working plane when the electromagnetic beams are directed to the same position on a plane in the nominal (as opposed to actual) position of the working plane.

According to a thirteenth aspect of the invention there is provided apparatus comprising a plurality of optical scanners including first and second optical scanners, each optical scanner comprising an optical train for directing a corresponding electromagnetic beam to locations on a working plane and an on-axis photodetector for detecting electromagnetic radiation reflected back along the optical train; at least the first optical scanner comprising a position sensitive detector or camera for detecting a position of a feature within a field of view; and a controller arranged to control the first and second optical scanners such that a spot of the corresponding electromagnetic beam or a feature formed by the corresponding electromagnetic beam of the second optical scanner is within the field of view and determine whether the coordinate positions of a first and second scanners of the plurality of scanners are aligned at the working plane from a position of the spot or the feature within the field of view as determined using the on-axis position sensitive detector or camera, control the first and second optical scanners to scan the corresponding electromagnetic beam across a datum position within the apparatus, determine from the photodetector when the corresponding electromagnetic beam is directed to the datum position and a demand position for each of the first and second scanners that causes the corresponding electromagnetic beam to be directed to the datum position, compare the demand position to an expected demand position, and generate an output signal indicative of a shift in the working plane relative to calibration planes of the first and second scanners if the demand positions for both the first and second scanners correspond to the expected demand positions but the first and second scanners are not aligned at the working plane.

According to a fourteenth aspect of the invention there is provided a data carrier having instructions thereon which, when executed by a controller of an apparatus a plurality of scanners, each optical scanner for directing a corresponding electromagnetic beam to locations on a working plane, cause the apparatus to carry out the method of the twelfth aspect of the invention.

According to a fifteenth aspect of the invention there is provided a method of determining an alignment of an optical scanner for directing an electromagnetic beam to locations within a working plane, the optical scanner movable relative to the working plane, the method comprising determining a calibration map for positioning of the electromagnetic beam on the working plane by the optical scanner for a first position of the optical scanner relative to the working plane; moving the optical scanner to a second position relative to the optical plane; detecting with an on-axis photodetector, which views the working plane along an optical axis of the optical train of the optical scanner used to direct the electromagnetic beam, a reference element and determining a transformation of the calibration map based upon the signals from the photodetector.

The calibration map may be determined using a calibration artefact as described with reference to the first aspect of the invention. The reference element may be detected in accordance with the method of the first aspect of the invention.

The method may comprise detecting with an on-axis photodetector a plurality of reference elements. This may allow a transformation to be determined for multiple degrees of freedom, such a roll, pitch and yaw of the optical scanner as it is moved from the first position to the second position.

The calibration map may define a calibration plane across which the positioning of the electromagnetic beam as directed by the optical scanner is determined and the transformation of the calibration map may comprise aligning the calibration plane with the working plane for the second position of the optical scanner.

According to a sixteenth aspect of the invention there provided apparatus comprising optical scanner for directing an electromagnetic beam to locations on a working plane, the optical scanner movable relative to the working plane; an on-axis photodetector, which views the working plane along an optical axis of the optical train of the optical scanner used to direct the electromagnetic beam; and a controller arranged to control the optical scanner based on a calibration map for positioning of the electromagnetic beam in a calibration plane, which aligns with the working plane for a first position of the optical scanner relative to the working plane; the controller further arranged to determine a position of a reference element from photodetector signals when the optical scanner is in a second position relative to the working plane and determine a transformation of the calibration plane to align the calibration plane with the working plane when the optical scanner is in the second position based upon the signals from the photodetector.

According to a seventeenth aspect of the invention there is provided a data carrier having instructions thereon which, when executed by a controller of an apparatus comprising an optical scanner for directing an electromagnetic beam to locations on a working plane, the optical scanner movable relative to the working plane; and an on-axis photodetector, which views the working plane along an optical axis of the optical train of the optical scanner used to direct the electromagnetic beam; wherein the controller is arranged to control the optical scanner based on a calibration map for positioning of the electromagnetic beam in a calibration plane, which aligns with the working plane for a first position of the optical scanner relative to the working plane; cause the controller to determine a position of a reference element from photodetector signals when the optical scanner is in a second position relative to the working plane and determine a transformation of the calibration plane to align the calibration plane with the working plane when the optical scanner is in the second position based upon the signals from the photodetector.

According to an eighteenth aspect of the invention there is provided a method of characterising a laser beam directed by an optical scanner, the method comprising locating a reference element within a scan field of the optical scanner; controlling the optical scanner to cause the laser beam to be directed to at least one reference element; detecting reflected electromagnetic radiation for different focal lengths of the laser beam and determining a characteristic the laser beam from how intensity of the detected reflected electromagnetic radiation varies with focal length of the laser beam.

The characteristic may be a location of a focal point of the laser beam and/or a divergence of the laser beam. The reference element may be a reference element described with respect to the first aspect of the invention comprising a circular or spherical surface.

According to a nineteenth aspect of the invention there provided apparatus comprising an optical scanner for directing a laser beam and an on-axis photodetector, which views detects electromagnetic radiation reflected along an optical axis of the optical train of the optical scanner used to direct the electromagnetic beam; and a controller arranged to control the optical scanner to cause the laser beam to be directed to at least one reference element, wherein a focal length of the laser beam is altered; and determine a characteristic the laser beam from how intensity of the detected reflected electromagnetic radiation varies with focal length of the laser beam.

According to a twentieth aspect of the invention there is provided a data carrier having instructions thereon which, when executed by a processor causes the processor to receive photodetector signals from a photodetector of apparatus comprising an optical scanner for directing a laser beam, wherein photodetector detects electromagnetic radiation reflected along an optical axis of the optical train of the optical scanner used to direct the electromagnetic beam; wherein a focal length of the laser beam is altered for different ones of the photodetector signals, and determine a characteristic the laser beam from how intensity of the detected reflected electromagnetic radiation varies with focal length of the laser beam.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

According to a twenty-first aspect of the invention there is provided an apparatus comprising an optical scanner for directing an electromagnetic beam to locations within a planar scan field, a detector for detecting reflected electromagnetic radiation, and a reference artefact located within the planar scan field, the reference artefact comprising a curved reflective surface having a radius extending out from the planar scan field, the reference element arranged such that an amount of electromagnetic radiation of the electromagnetic beam retroreflected from the reflective surface is dependent on an angle of incidence of the electromagnetic beam to the reflective surface.

The reference element may be a reference element as described with reference to the above aspects of the invention.

According to a twenty-second aspect of the invention there is provided a method of determining an alignment of an optical scanner for directing an electromagnetic beam to locations within a scan field, the method comprising locating a reference element within the scan field of the optical scanner, the reference element comprising a curved reflective surface; controlling the optical scanner to cause the electromagnetic beam to be directed to a plurality of points on the curved reflective surface; detecting reflected electromagnetic radiation; determining when the electromagnetic beam is normal to the curved reflective surface from a comparison of an intensity of the detected electromagnetic radiation for the different points; and determining a corresponding demand signal that causes the optical scanner to direct the electromagnetic beam to the point at which the electromagnetic beam is normal to the curved reflective surface.

DESCRIPTION OF THE DRAWINGS

FIGS. 19a to 19c show images built up from the photodetector signals obtained for different positions of the laser beam on the calibration element and how the image is distorted through the application of different pipeline delays;

FIG. 20 is a graph indicating how a measure of major and minor axis of the image of the calibration element alters with pipeline delay.

DESCRIPTION OF EMBODIMENTS

Figure 1:
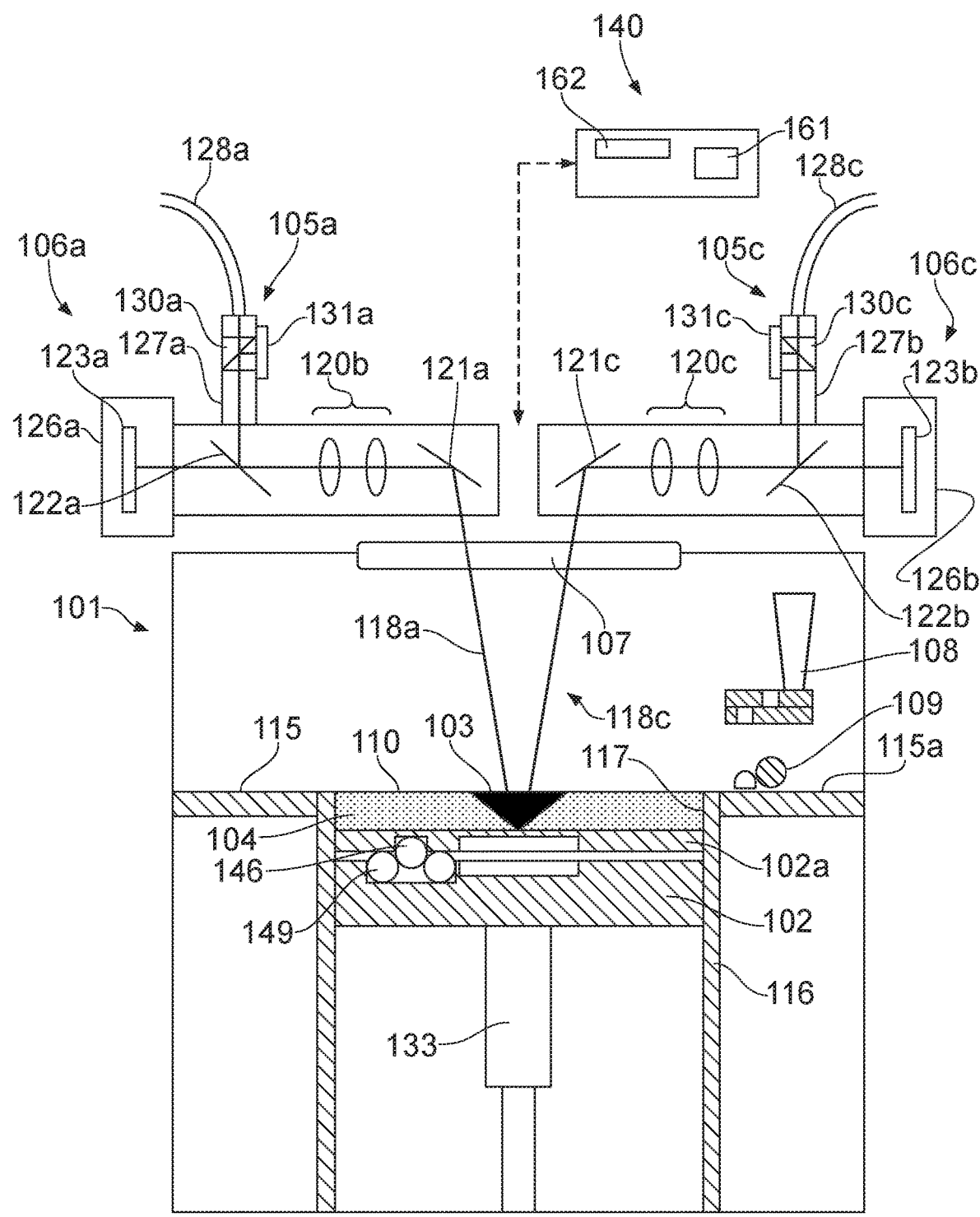
FIG. 1 shows an additive manufacturing apparatus according to an embodiment of the invention.
Figure 2:
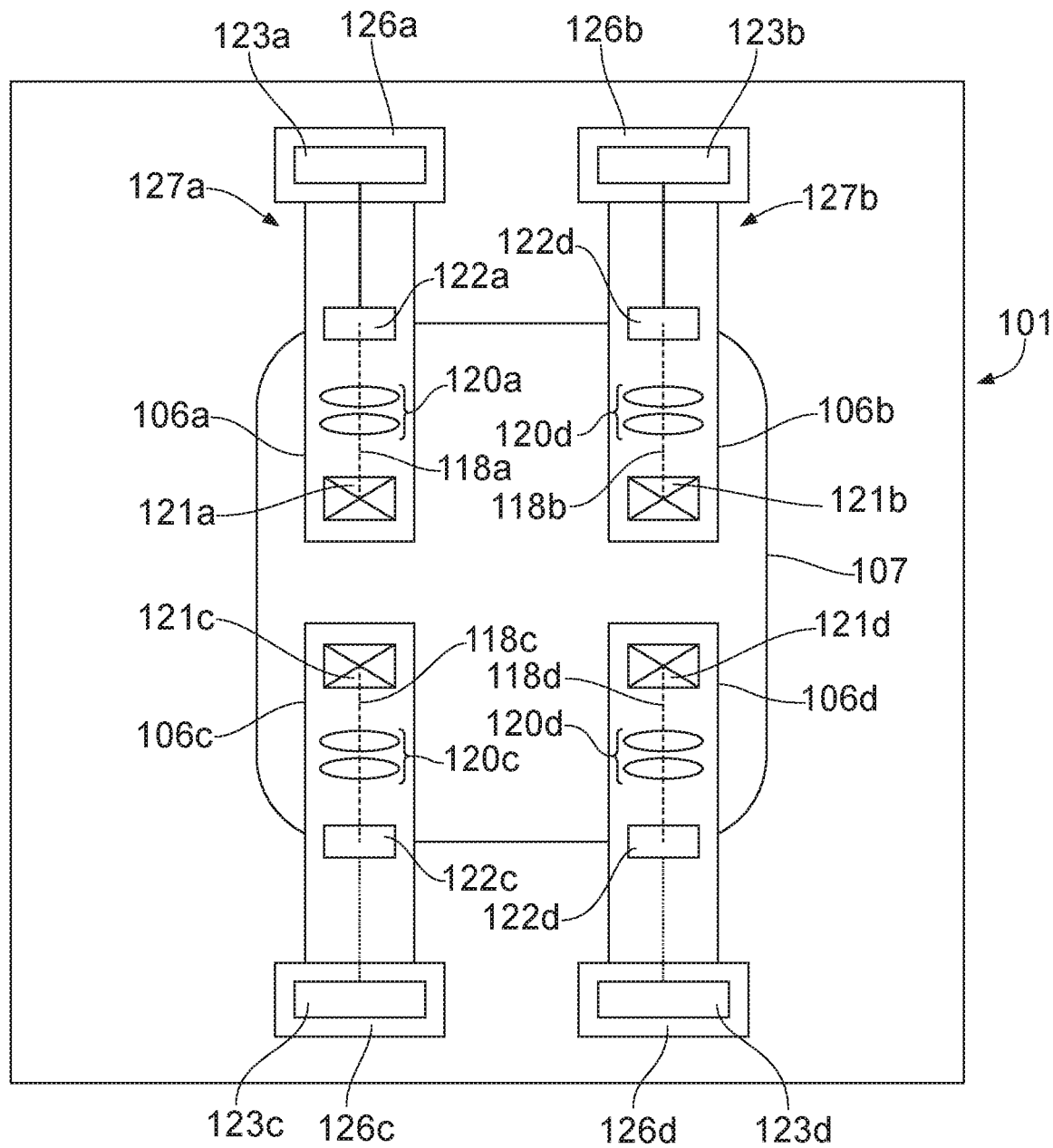
FIG. 2 is a plan view of the additive manufacturing apparatus shown in FIG. 1.
Figure 3:
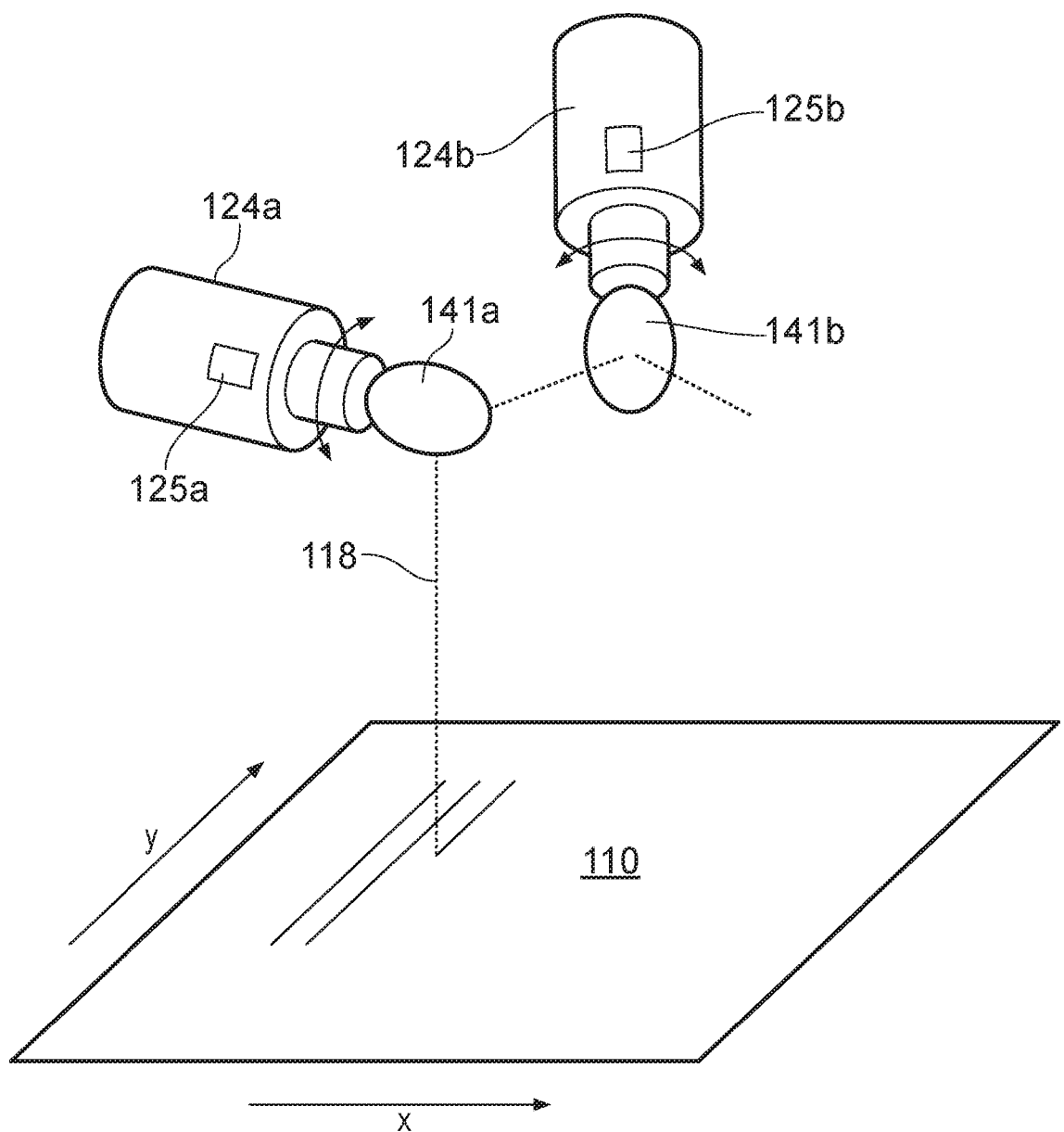
FIG. 3 is a perspective view of galvanometer system of an optical scanner of the additive manufacturing apparatus shown in FIGS. 1 and 2.
Figure 18A:
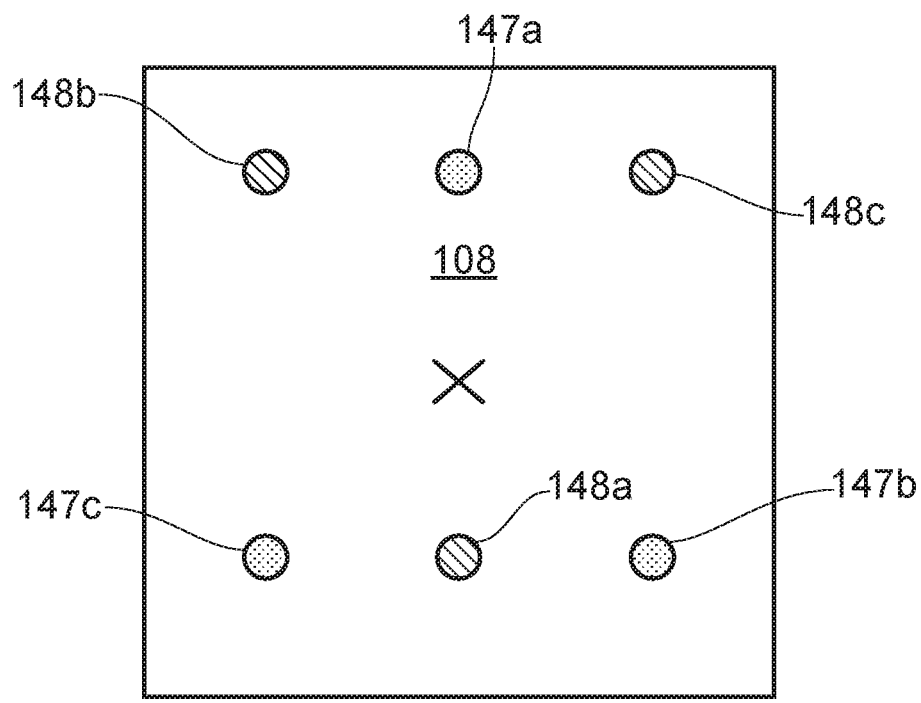
FIG. 18a is a plan view of a mounting surface of the calibration artefact and FIG. 18b is a plan view of a mounting surface of the build platform.
Figure 18B:
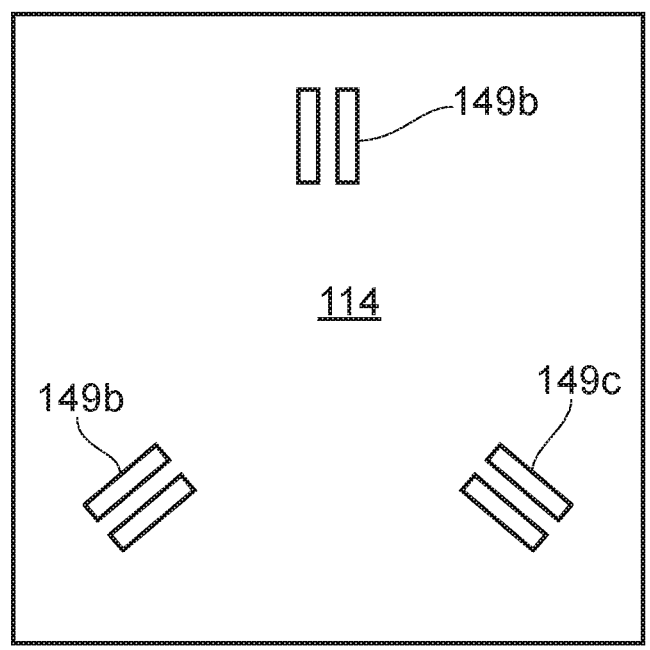

Referring to FIGS. 1 to 3, an additive manufacturing apparatus according to an embodiment of the invention comprises a build chamber 101 having therein a processing plate 115 having an aperture therein and a build sleeve 116 extending down from the aperture. A build platform 102 is lowerable in the build sleeve 116 such that build sleeve 116 and build platform 102 together define a build volume 117. The build platform 102 supports a build substrate plate 102a, a powder bed 104 and workpiece (object) 103 as the workpiece is built by selective laser melting of the powder. The platform 102 is lowered within the build volume 117 under the control of a drive mechanism (not shown) as successive layers of the workpiece 103 are formed. The build substrate plate 102a is mounted on to the build platform 102 using mounting formations 146 on the build substrate plate 102a and mounting formation 149 on the build platform 102, which together define one or more repeatable positions of the build substrate plate 102a on the build platform 102. The kinematic mounting formations are of the type described in more detail below with reference to FIGS. 18a and 18b.

Layers of powder 104 are formed as the workpiece 103 is built by dispensing apparatus 108 and a recoater 109. For example, the dispensing apparatus 108 may be apparatus as described in WO2010/007396. The dispensing apparatus 108 dispenses powder onto an upper surface 115a defined by processing plate 115 and is spread across the powder bed by the recoater 109. A position of a lower edge of the recoater 109 defines a working plane 110 at which powder is consolidated.

A plurality of laser modules 105a, 105b, 105c and 105d generate laser beams 118a, 118b, 118c, 118d for melting the powder 104. Each laser module comprises a fibre optic 128a, 128b, 128c, 128d and beam delivery optic (BDO) 127a, 127b, 127c, 127d for delivering the laser beam 118a, 118b, 118c, 118d to the corresponding optical scanner 106a, 106b, 106c, 106d. The optical scanner 106a, 106b, 106c, 106d steers the laser beams 118a, 118b, 118c, 188d on to selected areas of the powder bed 104 in order to build the object. The laser beams 118a, 118b, 118c, 118d enter through a common laser window 107.

Each optical scanner 106a, 106b, 106c, 106d comprises movable steering optics 121, such a two mirrors 141a, 141b mounted on galvanometers 124a, 124b (see FIG. 3), for steering the laser beam 118 in perpendicular directions, X and Y, across working plane 110 and focusing optics 120, such as two movable lenses for changing the focus of the laser beam 118. The optical scanner is controlled such that the focal position of the laser beam 118 remains in the same plane 110 as the laser beam 118 is moved across the working plane 110. Angular position sensors 125a, 125b are integrated into each galvanometer 124a, 124b for measuring an angular position of the corresponding mirror 121a, 121b.

Figure 4:
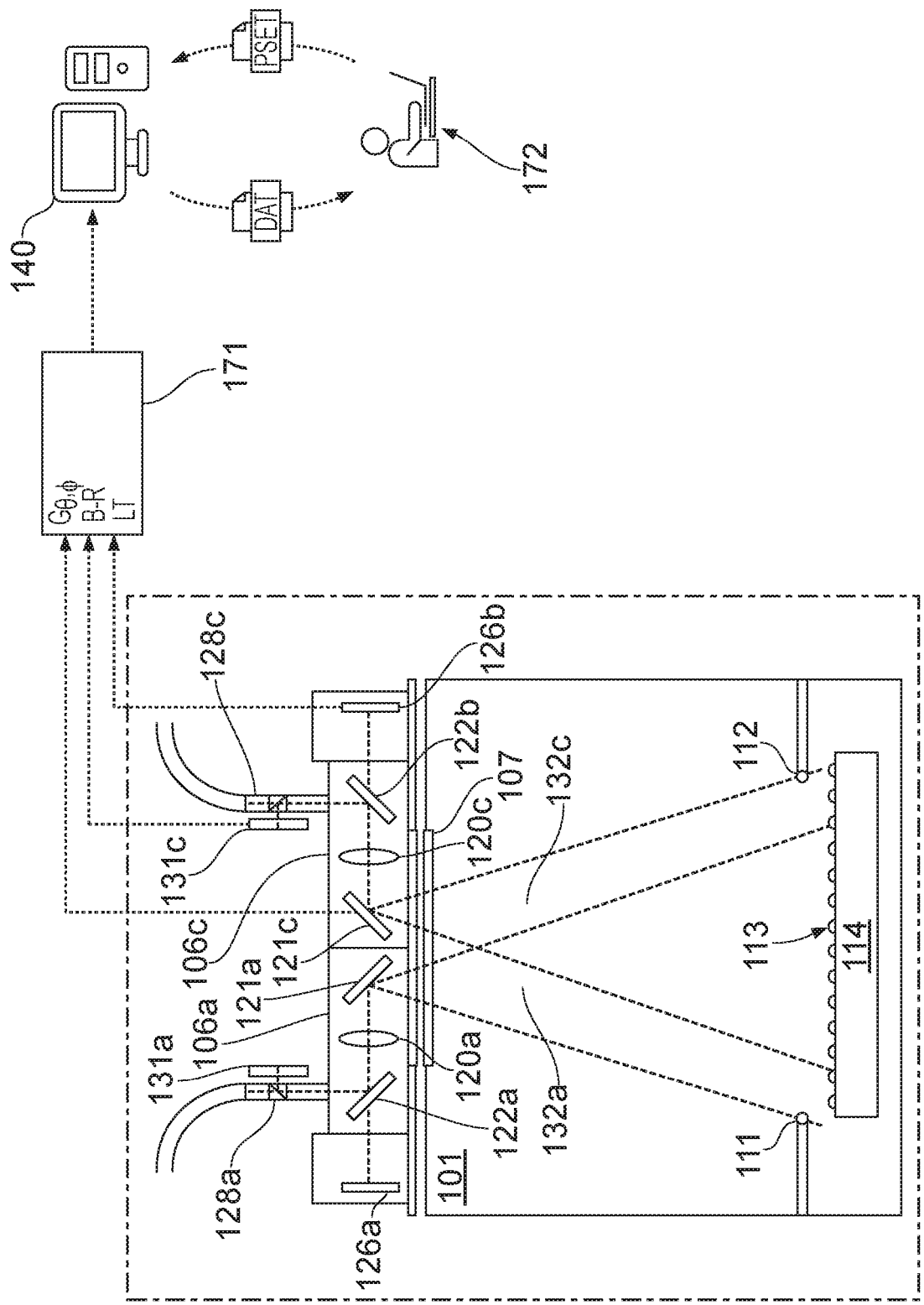
FIG. 4 is a schematic view of the additive manufacturing apparatus in which reference elements have been located.
Figures 16A, 16B:
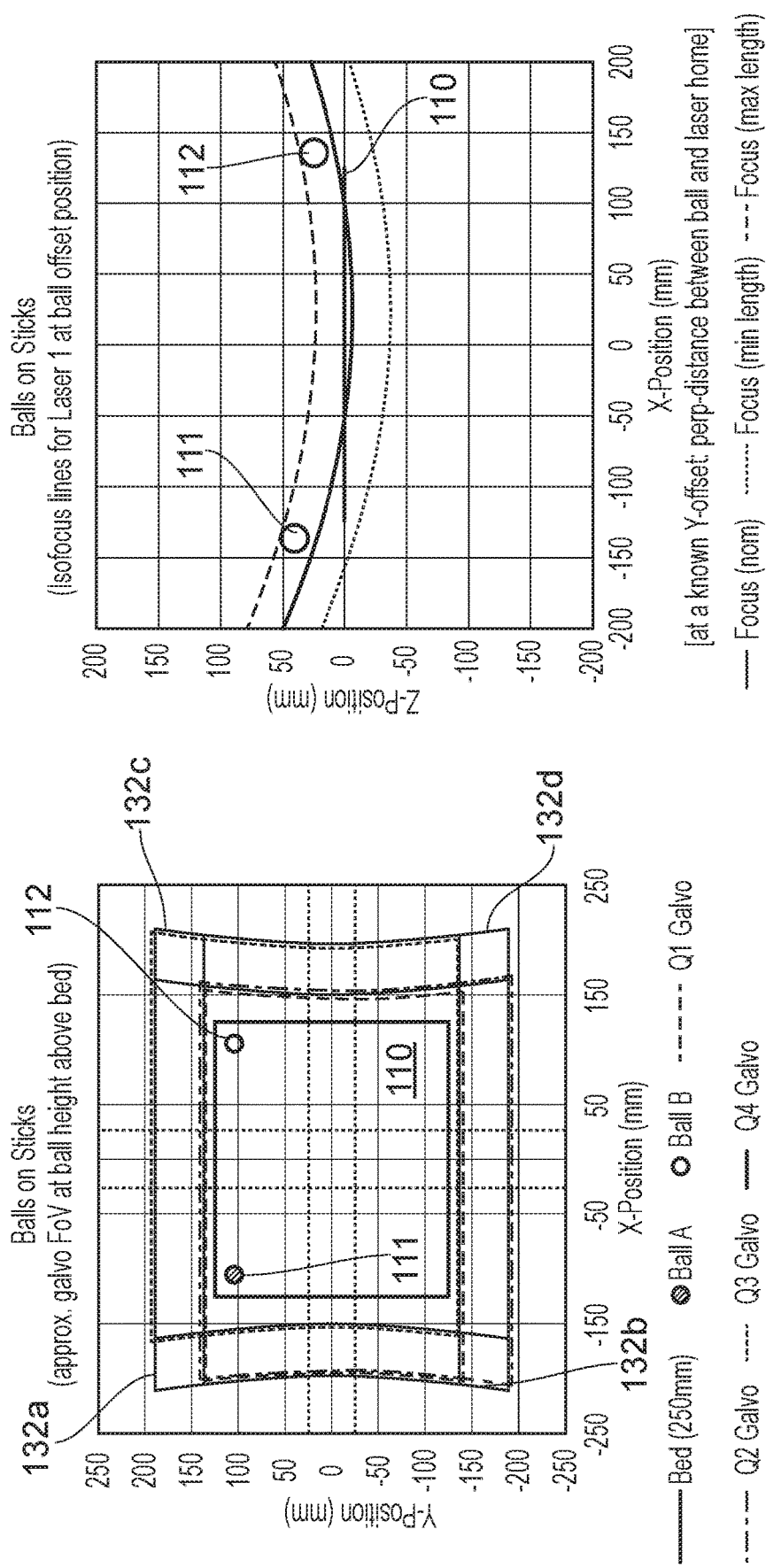
FIGS. 16a and 16b illustrate the constraints imposed on a position of a reference element resulting from a focal range of the optical scanners.

As shown in FIG. 4 and FIGS. 16a and 16b, each optical scanner 106a, 106b, 106c, 106d is capable of directing the corresponding laser beam 118a, 118b, 118c, 118d over a scan field 132a, 132b, 132c, 132d. Located within the build chamber 101 are reference elements 111, 112 in the form of balls (for example, spheres) elevated above the working plane 110 and within a scan field 132a, 132b, 132c, 132d of at least one of the optical scanners 106a, 106b, 106c, 106d whilst not obstructing the path of the laser beam 118a, 118b, 118c, 118d to the powder bed 104. The reference elements 111 and 112 must also be within the focal range of the movable focusing optics 120 of the optical scanners. FIG. 16b illustrates the focal range (focal field) of one of the optical scanners and how the reference elements can be located above the working plane 110 but within the focal range. By locating the reference elements 111, 112 above the working plane 110, the risk of contamination of the reference elements 111, 112 with powder may be reduced.

Figure 14:
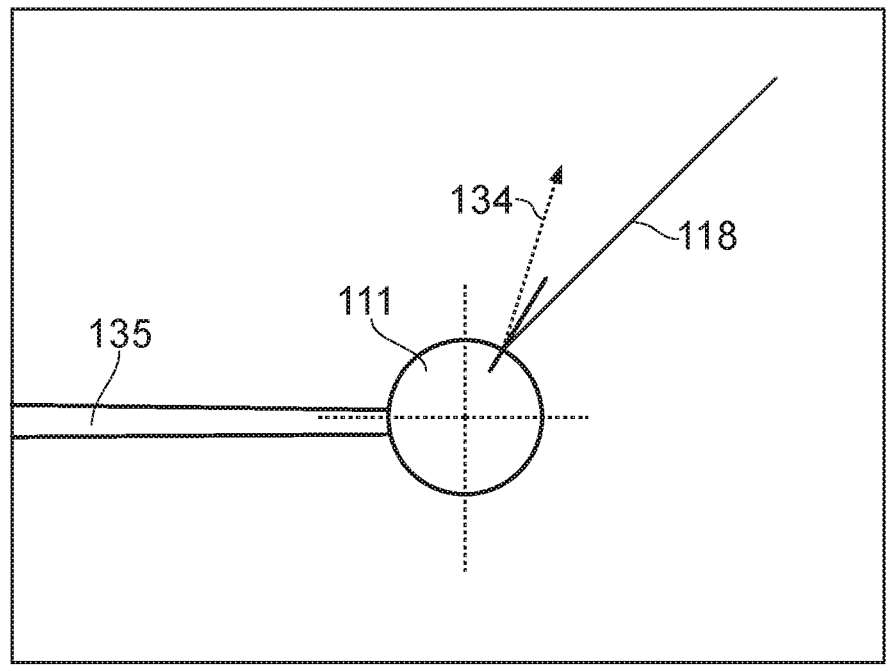
FIG. 14 is a side view of a reference element mounted on a rod for mounting the reference element secured in the additive manufacturing apparatus and elevated above the working plane.
Figure 15:
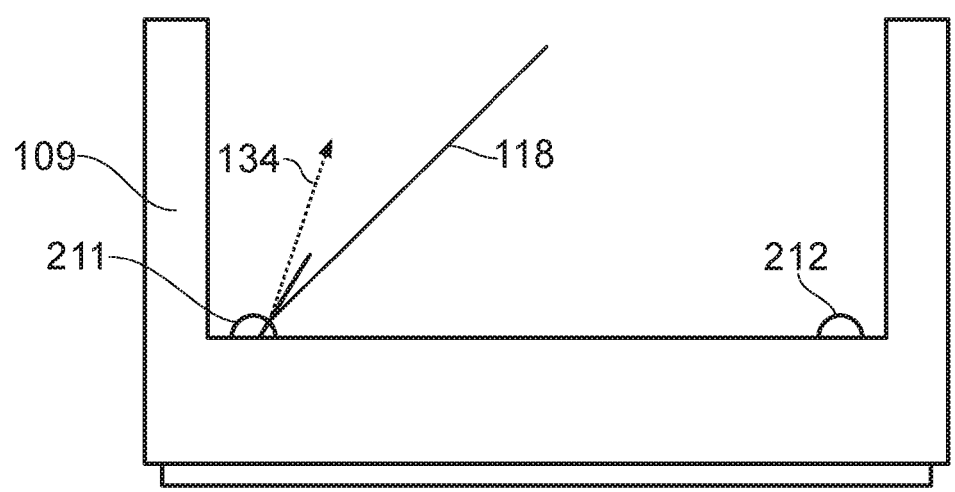
FIG. 15 is a side view of a recoater and a reference element mounted on the recoater.

In this embodiment, as shown in FIG. 14, the reference elements 111, 112 are mounted on stalks 135 so as to project from a wall of the build chamber 101 into the focal field of the optical scanner. The mounting 135 is preferably made of Invar such that a location of the reference elements 111, 112 remains substantially fixed under thermal changes. Accordingly, the reference elements 111, 112 can act as a datum for checks during the build and will be referred to hereinafter as datum elements. However, the z-height of the focal field is small (typically, +/−50 mm) and it may be difficult to mount the datum elements 111, 112 without interfering with recoater movement. Accordingly, in an alternative embodiment, shown in FIG. 15, the datum elements are located on the recoater 109 and move across the powder bed 104 with recoater movement. In this alternative embodiment, in-process checks of the optical scanner calibration during the build, as described in more detail below, can be carried out when the datum elements 111, 112 are located above the powder bed 104 along a path of the laser beam 118 from the optical scanner 106 to the powder bed 104. Locating the datum elements 111, 112 on the recoater 109, frees up the space either side of the powder bed 104 for movable elements, such as recoater arms.

Each laser module 105a, 105b, 105c and 105d comprises a photodetector 131a, 131b, 131c, 131d and a splitter 130a, 130b, 130c, 130d integrated into the delivery fibre 128a, 128b, 128c, 128d or BDO 127a, 127b, 127c, 127d, the splitter 130a, 130b, 130c, 130d directing electromagnetic radiation travelling backward in the optical fibre to the photodetector 131a, 131b, 131c, 131d. In one embodiment, the splitter 130a, 130b, 130c, 130d comprises a cladding mode stripper which directs electromagnetic radiation in the coating material to the photodetector 131a, 131b, 131c, 131d. In another embodiment, the splitter 130a, 130b, 130c, 130d comprises a detector optical fibre core in optical contact with the delivery optical fibre core, wherein the delivery core and the detector optical fibre core are surrounded by a common coating material, the second optical fibre core directed towards the photodetector 131a, 131b, 131c, 131d.

The photodetector 131a, 131b, 131c, 131d is arranged to detect light at an excitation wavelength of the electromagnetic beam, such as a laser wavelength, that is reflected back to the BDO 127a, 127b, 127c, 127d of the fibre laser along the same path that the electromagnetic beam is delivered to the working surface 110.

Furthermore, each optical scanner 106a, 106b, 106c, 106d comprises a beam splitter 122 which reflects the laser beam 118 and transmits wavelengths of radiation coming from the working plane 110 of the powder bed 104. The beam splitter 122 may be arranged to transmit wavelengths that differ from a wavelength of the laser beam. The radiation that passes through the beam splitter 122 is delivered to a detector module 126 and is directed onto an on-axis melt pool sensor 123 in the form of a position sensitive detector (PSD). In another embodiment, the melt pool sensor 123 is a single photodetector that integrates the intensity over the field of view or a camera, such as a CCD. The optical system may comprise further filters for filtering out wavelengths that are not of interest before the radiation is incident on the melt pool sensor 123. For example, only visible light may be of interest, such as that emitted by the plasma, or light in the infrared spectrum that arises from thermal emissions from the melt pool/plasma.

A master controller 140, comprising processor 161 and memory 162, is in communication with modules of the additive manufacturing apparatus, namely the laser modules 105a, 105b, 105c, 105d, optical scanners 106a, 106b, 106c, 106d, build platform 102, dispensing apparatus 108, wiper 109, sensors 123a, 123b, 123c, 123d, 125a, 125b and photodetector 131a, 131b, 131c, 131d.

As shown in FIG. 4, each optical scanner 106a, 106b, 106c, 106d comprises a scanner controller 171 which receives signals from the detectors 123, 125a, 125b 131 of the optical scanner 106. The sensor data is reported from the optical scanner controller 171 to the master controller 140 in the manner described in WO2018/087556. This allows the sensor data from different detector modules to be correlated within a common time reference frame.

The master controller 140 controls the modules based upon software stored in memory 162 as described below. The master controller 140 may output signals to an external computer 172, for example over a network, such as the Internet. The processing described below may be shared between the master controller 140 and the external computer 172. For example, the external computer may calculate a calibration map and/or pipeline delay but the master controller 140 may carry out in-build checks using the datum elements 111, 112.

Figure 10:
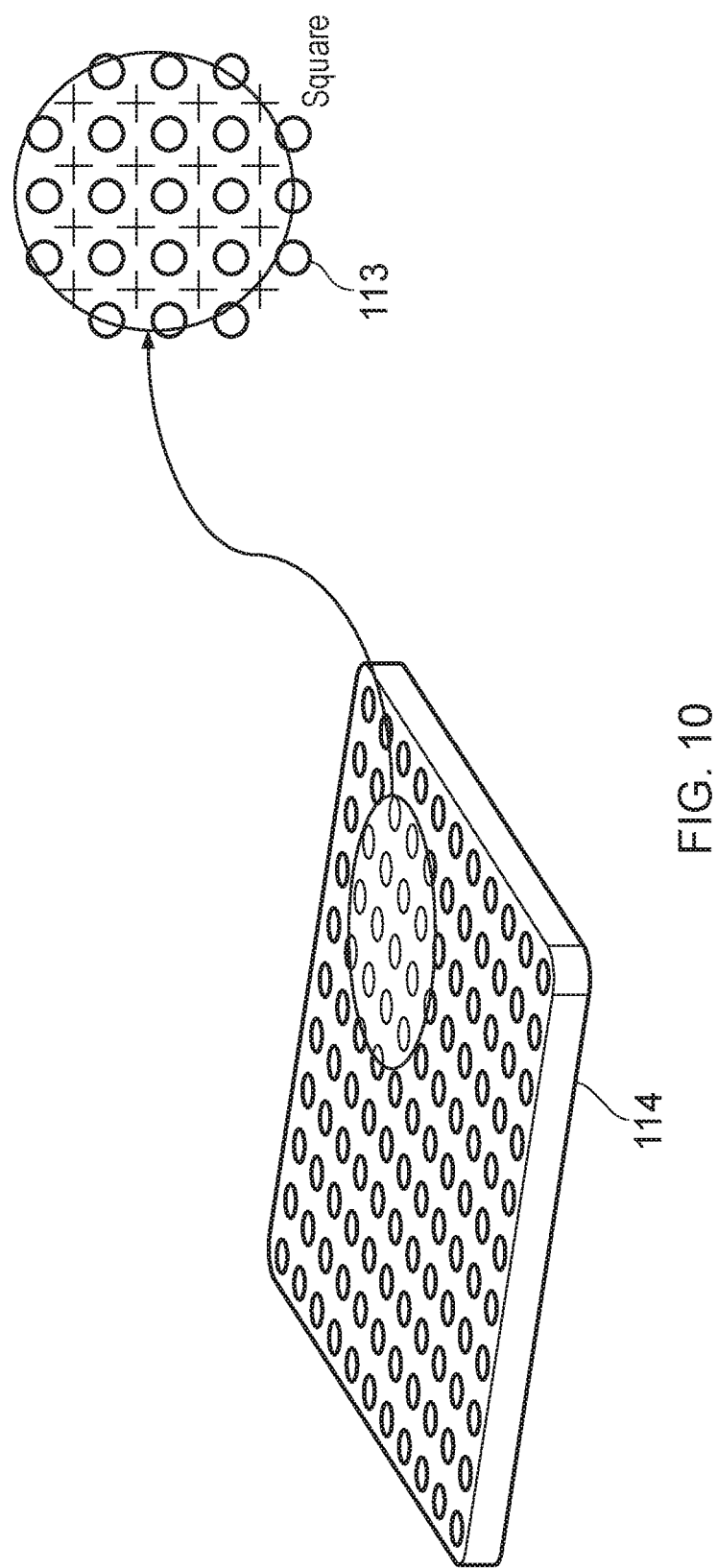
FIG. 10 is a perspective view of a first embodiment of a calibration artefact according to the invention comprising a plurality of reference elements set out in a square array.
Figure 11:
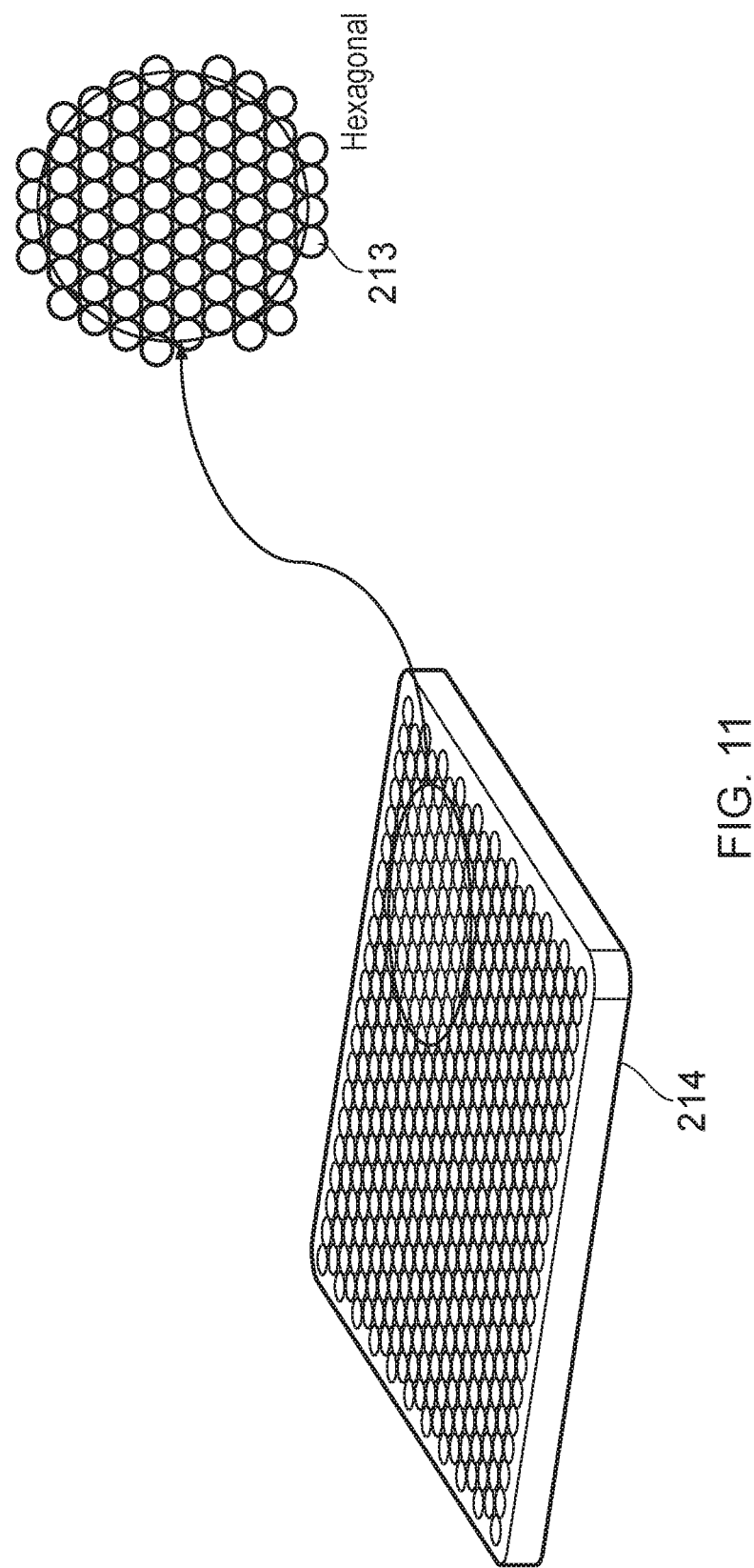
FIG. 11 is a perspective view of a second embodiment of a calibration artefact according to the invention comprising a plurality of reference elements set out in a hexagonally packed array.

Before the build commences, a calibration of the optical scanners 106a, 106b, 106c, 106d is carried out using calibration artefact 114. The calibration artefact 114 comprises an array of reference elements 113, in this embodiment in the form of an array of spheres mounted in a regular pattern on a carrier plate 119. The reference elements 111, 112, 113 are opaque, reflecting the laser beams 118a, 118b, 118c, 118d, preferably a specular rather than diffuse reflection, at the surface of the reference elements 111, 112, 113 (i.e. at the interface between the atmosphere and the solid reference element 111, 112, 113). The reference elements 111, 112, 113 are made of a material having a sufficiently high reflectivity for the laser beams 118a, 118b, 118c, 118d and thermal properties such that no ablation, melting or damage occurs to the reference elements 111, 112, 113 when exposed to the laser beams 118a, 118b, 118c, 118d. In this embodiment, the spheres 113 are 12 mm diameter polished tungsten carbide balls in a 14 mm pitch array. The regular pattern may be a square array of the spheres, as shown in FIG. 10 or a hexagonal array, as shown in FIG. 11. A hexagonal arrangement achieves closer packing of the spheres and thus allows for a higher resolution calibration. The spheres 113 are mounted such that their centres are located substantially within the same plane, a so-called calibration plane.

It will be understood that other shaped reference elements 111, 112, 113 could be used, such as hemispheres or other partial sections of a sphere.

Figure 12:
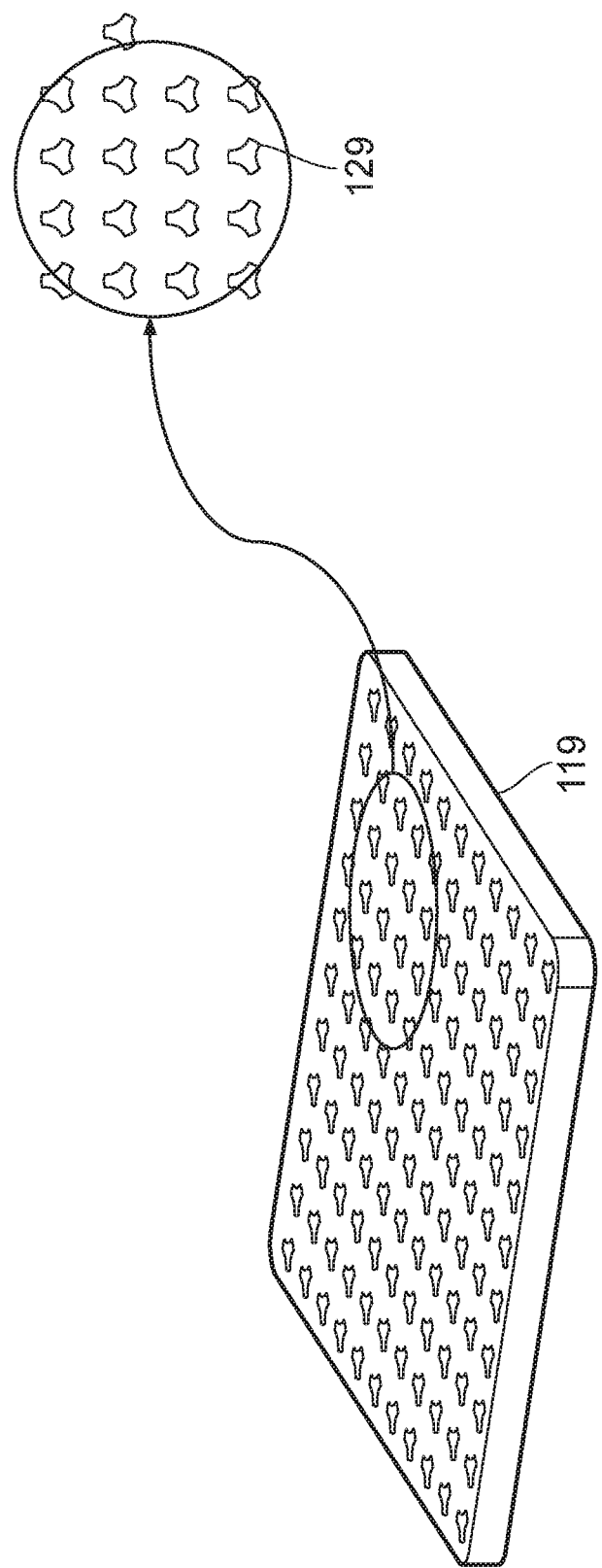
FIG. 12 is a perspective view of a calibration plate for mounting spheres to form a calibration artefact shown in FIG. 10 comprising tri-lobed mounting recesses for mounting of the spheres.
Figure 13A:
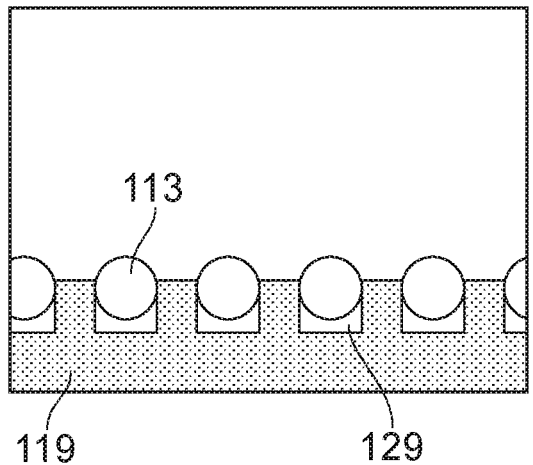
FIGS. 13a to 13f are cross-sectional views of alternative methods of mounting the spheres on the calibration element and other reference elements with spherical surfaces.

FIGS. 12 and 13a show a tri-lobe mounting formation for the mounting of the spheres 113 on the carrier plate 119. Recesses 129 are formed in the carrier plate 119, the walls defining each recess shaped to comprise three lobes. The spheres 113 are push fitted into the recesses 129 to engage the lobes such that a position of the sphere in the recess 129 is defined by a position of the lobes. The tri-lobed recesses 129 may be formed with high accuracy, for example by machining, to accurately define the positions of the spheres on the carrier plate 119. The clamping force provided by the tri-lobes of the recess 129 may be sufficient to hold the spheres 113 in place. However, adhesive may be used if necessary.

Alternative arrangements are shown in FIGS. 13b to 13f.

Figure 13B:
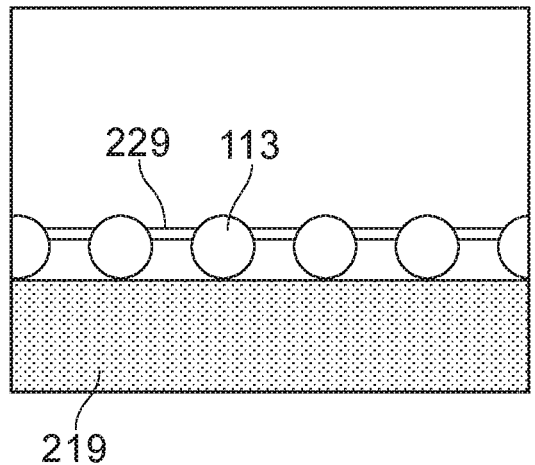

FIG. 13b illustrates a clamping plate 229 which is secured to a carrier plate 219 at its periphery and has holes cut therein, for example using laser cutting, for locating the spheres 113 in an array on the carrier plate 219, the spheres 119 clamped between the carrier plate 219 and the clamping plate 229.

Figure 13C:
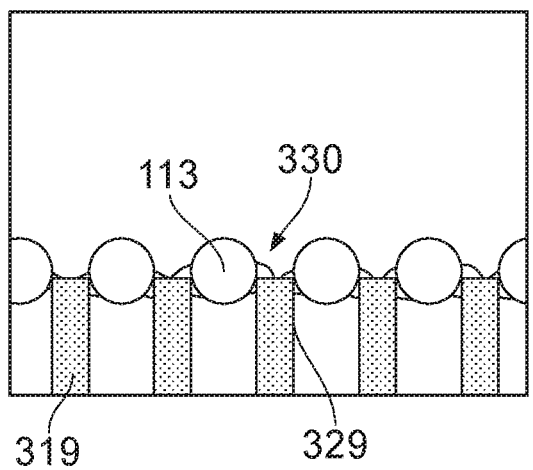

FIG. 13c illustrates a carrier plate 319 having holes 329 formed therein, for example by machining, each hole 329 having a smaller radius than the corresponding sphere 113. The spheres 113 are located by engaging each sphere 113 with a corresponding hole 329 and securing the sphere 113 in place using an adhesive 330.

Figure 13D:
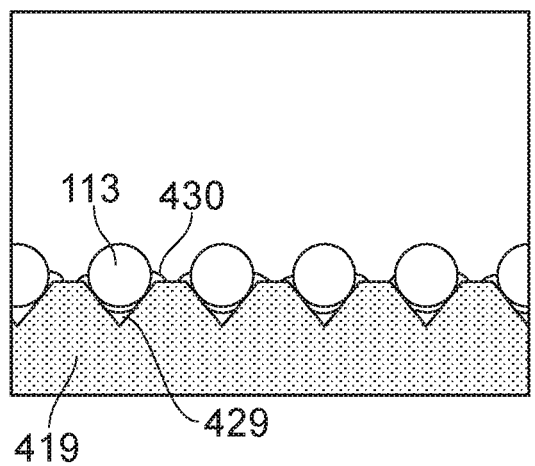

FIG. 13d illustrates a carrier plate 319 having v-shaped recesses 429 formed therein, for example by machining, each. The spheres 113 are located by engaging each sphere 113 with a corresponding v-shaped recess 429 and securing the sphere 113 in place using an adhesive 430.

In each of these embodiment, accurate placement of the spheres 113 on the carrier plate 229, 329, 429 is achieved through accurate machining of mounting features in the carrier plate, which act to locate the spheres. The mounting feature may additionally secure the sphere 113 in place or the sphere may be secured in place using an additional fixing member/element, such as an adhesive.

Figure 13E:
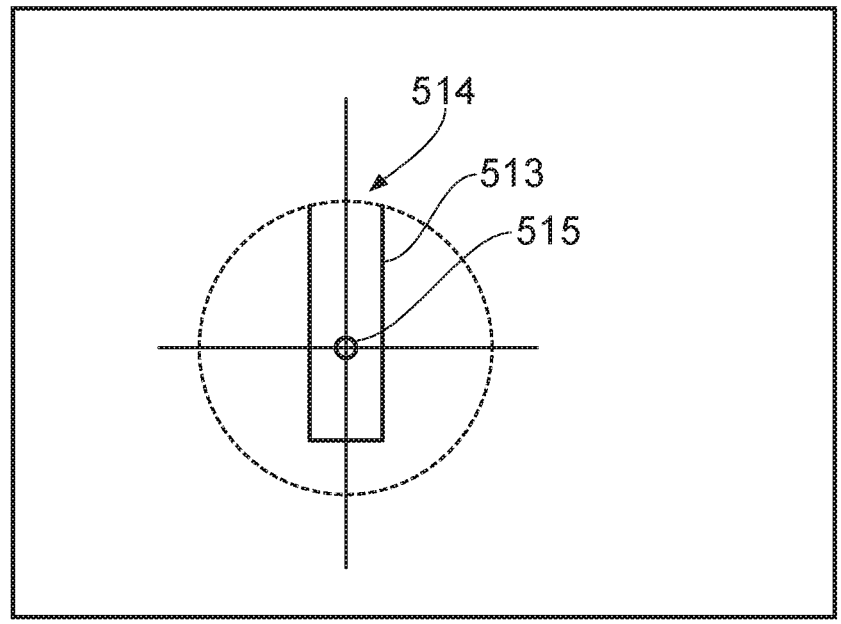
Figure 13F:
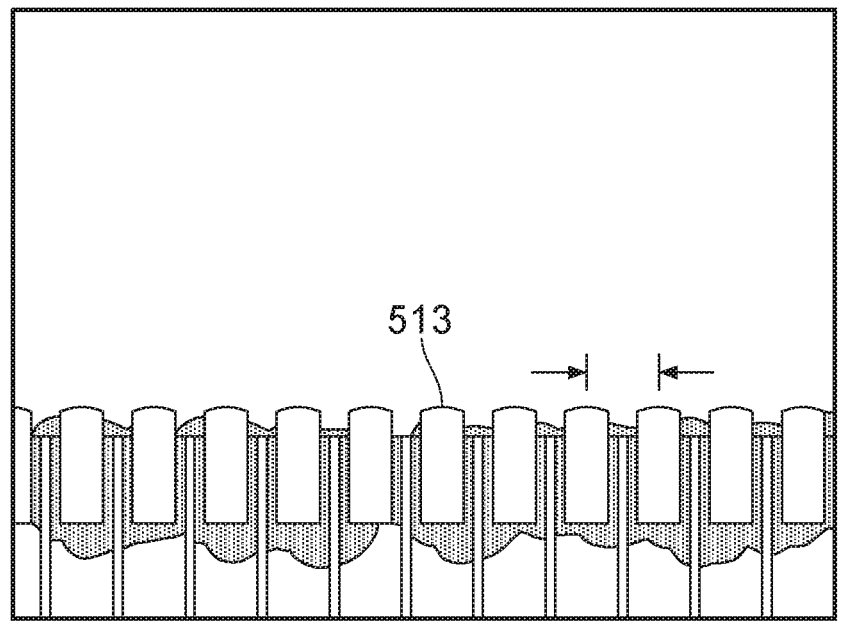

FIGS. 13e and 13f show a further embodiment of reference elements 513. In this embodiment, the reference elements 513 are not full spheres but are rods or pillars having a spherical surface 514 formed on the top thereof. The spherical surface 514 defines a centre 515 at which the laser beam 118 will be directed when at normal incidence to the surface 514. Through holes 515 are machined into a plate and the rods inserted into the through holes such that the spherical surface 514 protrudes from the through hole 515. The reference elements 513 may be glued in place. Such an arrangement allows the centres defined by the spherical surfaces 514 to be located more closely together than in the above described embodiments with spheres 113.

It is believed that the separation achievable with appropriately sized balls for laser beam of 1064 nm is sufficient to correct for the "long wavelength" errors, such as scale, offset and barrel distortion caused by the alignment of the optical module to the bed and the relative alignment of the two galvanometer mirrors 141a, 141b with each other. The error map for this kind of error source is non-linear, but the errors do not change direction rapidly. As a result, calibration points spaced apart by, for example 12 mm, will provide a sufficiently dense set of points to correct for these errors to the required accuracy (tens or ones of micrometres).

However, it is believed that there are also "short wavelength" errors, for example caused by the transduction of the galvanometer motors (encoder errors) which can cause a twitch of up to 50 micrometres as the mirrors 141a, 141b scan through an angle. It is believed that this twitch is unique for each galvanometer. This could imprint a line of error into the part as well as causing problems locally for maintaining laser-to-laser alignment. In order to map these errors, it is believed a pitch of centres closer to 5 mm or less would be required. However, the errors caused by these a short wavelength errors are typically much smaller than those caused by the longer wavelength errors and may be swamped by other factors that can cause differences between the actual part produced and the nominal part, such as thermal drift and/or shift of the part during the AM process. Accordingly, the benefit of correcting for these errors may be small and hence, it may be acceptable to not correct for these errors.

The calibration artefact further comprises on a mounting (lower) face kinematic mounting features 147, 148 for engaging with complimentary mounting formations 149 on the build platform 102. In this embodiment, the lower face comprises two sets of mounting formations, the first set comprising mounting formations 147a, 147b, 147c for locating the calibration artefact in a first position on the build platform 102 and a second set of comprising mounting formations 148a, 148b, 148c for locating the calibration artefact in a second position on the build platform 102. Each set of mounting formations provides a six-points of contact for defining a position of the calibration artefact in six degrees of freedom. In this embodiment, the mounting formations comprise three balls 147a, 147b, 147c; 148a, 148b, 148c that engage complementary grooves 149a, 149b, 149c. Each groove may be formed by a two, parallel rollers. Moving the calibration artefact between the two positions requires a rotation of the calibration artefact, but this is not essential and other arrangements of mounting formations may be used that do not require a rotation of the calibration artefact. In the two positions of the calibration artefact, spheres 113 are provided at different locations within the working plane 110. In this way, a greater density of calibration points is achieved using the calibration artefact 114, as described in more detail below.

Once the calibration artefact 114 has been assembled, the location of the centres for the spheres 113, 513 relative to each other is determined by measuring the spheres with a measuring system, such as a coordinate measuring machine (CMM). A sufficient number of measurements on a surface of each sphere will enable a position of a centre of that sphere to be calculated. The position of the centre may be measured to an accuracy of 10 microns or less.

The method of calibrating the optical scanners comprises locating the calibration artefact 114 on the build platform 201 in the first position such that the calibration plane is substantially co-planar with the working plane 110. This may be achieved by raising or lowering the build platform 102 with the calibration artefact 114 and measuring, for example using feeler gauges, a position of the calibration plane relative to a lower edge of the recoater 109. The calibration artefact may have landing pads formed, for example machined, therein on which the feeler gauges are located, the landing pads providing mounting positions having known locations (due to the measurements with the measuring system, relative to the calibration plane. Once the calibration artefact is positioned as desired each laser beam 118a, 118b, 118c, 118d is scanned across each sphere 113 using the corresponding scanner 106a, 106b, 106c, 106d.

Figure 17:
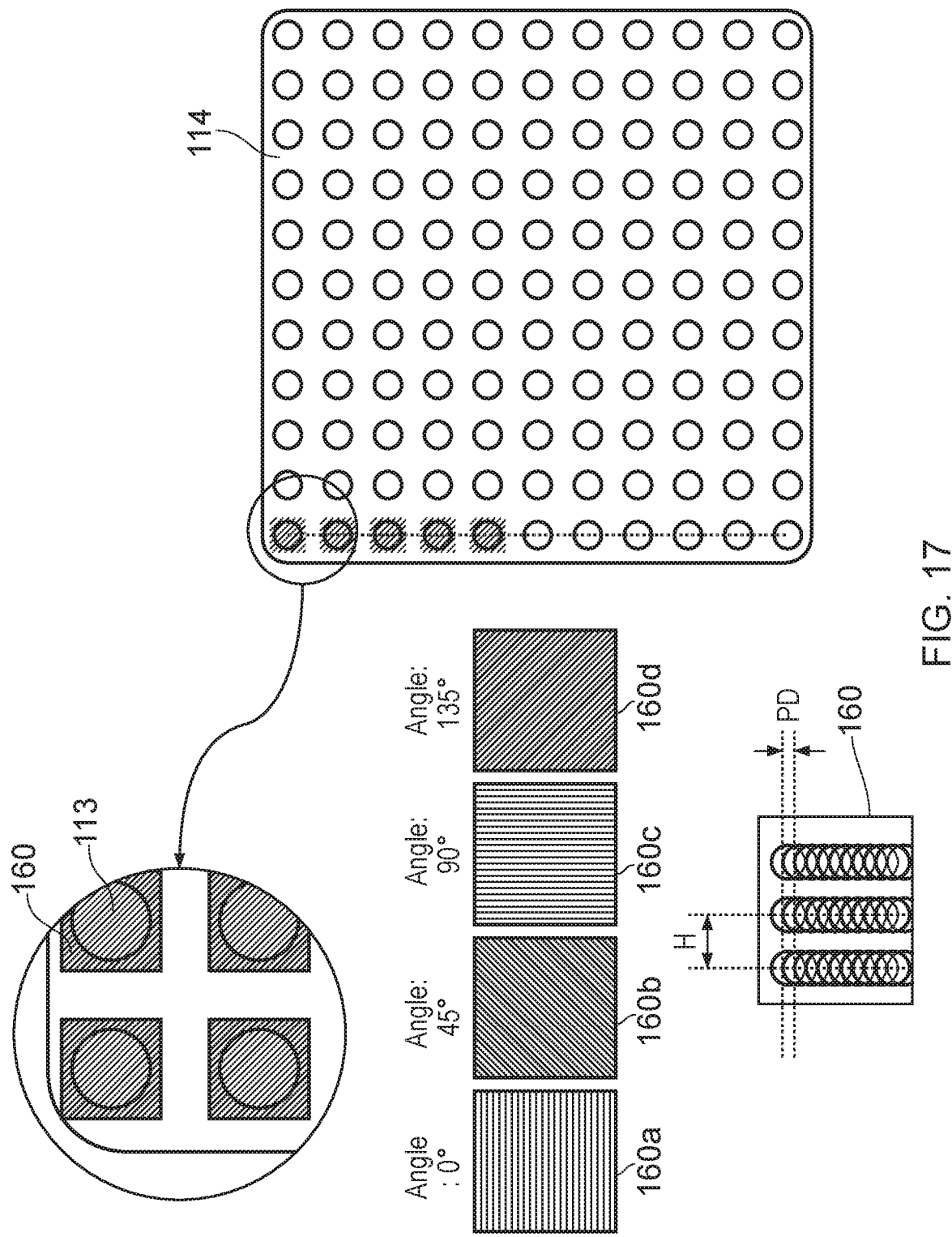
FIG. 17 illustrates a scanning routine for scanning each reference element according to an embodiment of the invention.

FIG. 17 shows the scanning patterns that are executed by each scanner 106a, 106b, 106c, 106d. Each scan pattern comprises a plurality of parallel hatch lines separated by a hatch distance, H. The laser beam 118 may be scanned along each hatch line continuously. However, in this embodiment, the laser beam 118 is scanned along each hatch line by exposing a series of points along the hatch line to the laser beam 118, wherein the laser beam 118 is switched off between each point exposure (during a "jump"). Successive hatch lines are scanned by the laser beams in opposite directions (bi-directional scanning). However, in another embodiment, unidirectional scanning may be used. The point exposures are spaced apart by a point distance, PD. In this embodiment, rather than scanning the entire working plane 110, the laser beams 118 are scanned in patches 160, each patch 160 located at a position of a sphere 113. Each laser beam 118a, 11b, 118c, 118d is scanned in four patches 160a, 160b, 160c, 160d over each sphere 113. For each patch, a direction of the hatch lines for each patch 160a, 160b, 160c, 160d is different. In this embodiment, the hatch lines are at angles of 0°, 45°, 90° and 135° relative to each other. Each scanner 106a, 106b, 106c, 106d scans each sphere 113, 513 successively and independently (i.e. not simultaneously) from the other scanners 106a, 106b, 106c, 106d.

Figure 5:
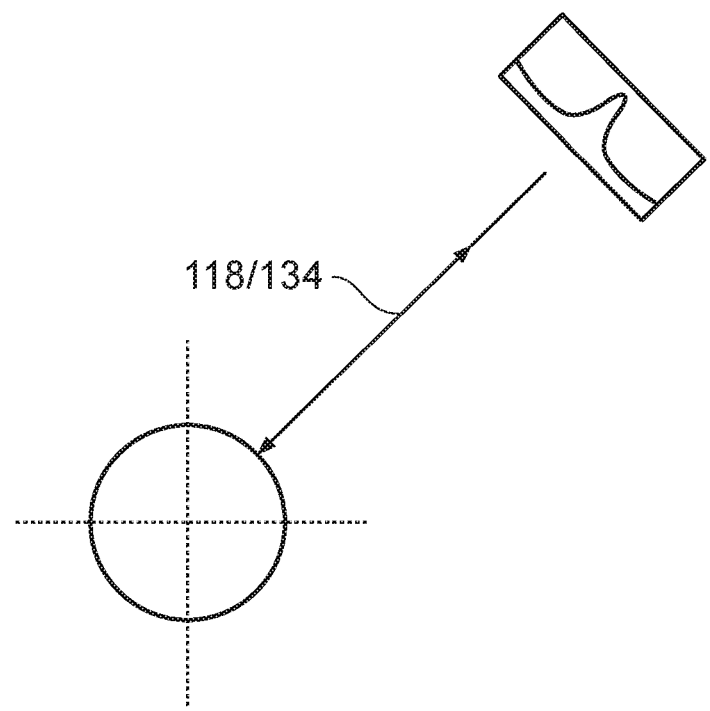
FIG. 5 illustrates a laser beam at normal incidence to a spherical surface of a reference element and the resultant peak in the detector signal generated by a photodetector.
Figure 6:
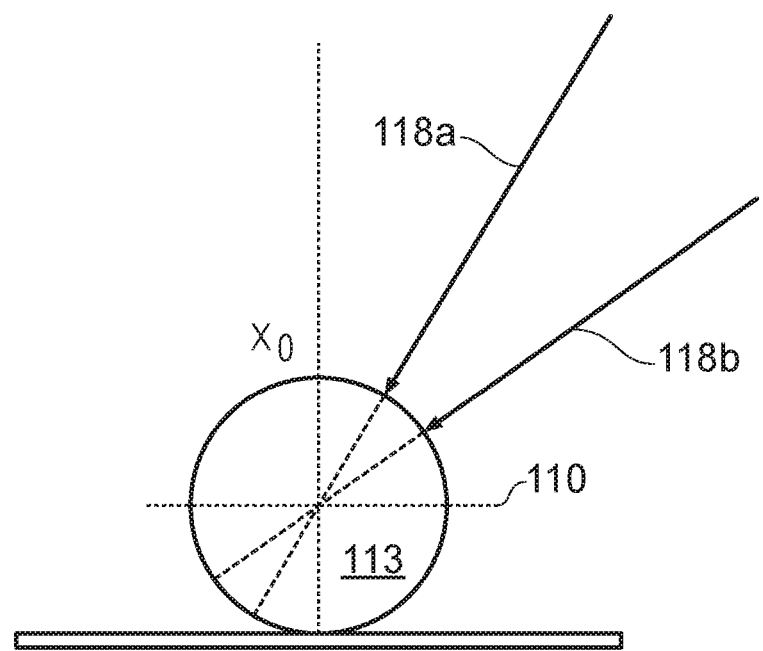
FIG. 6 illustrates first and second laser beams from corresponding first and second optical scanners of the additive manufacturing apparatus at normal incidence to a spherical surface of a reference element.

As each laser beam 118a, 118b, 118c, 118d is scanned across each calibration element 113 the laser beam 118a, 118b, 118c, 118d is reflected from the calibration element. If the laser beam 118 hits the surface away from normal incidence, the laser beam is reflected away from the optical scanner 106 and any signal generated by the photodetector 131 of the corresponding scanner 106 is relatively small compared to the signal generated when the laser beam is at normal incidence to the surface. This peak in the photodetector signal as the laser beam is scanned across the calibration element 113 is schematically represented in FIG. 5. The laser beam 118 will be at normal incidence when it is directed to a centre of the sphere 113. Accordingly, the peak will coincide with the laser beam 118 being directed at the known reference position of the centre of the sphere 113. For the different scanners 106a, 106b. 106c. 106d, the laser beams 118b, 118c, 118d will strike different points on the surface of the sphere 113 when directed towards the centre of the same sphere 113, as shown in FIG. 6.

Each (or at least one of the) optical scanner(s) 106a, 106b, 106c, 106d may comprise a scan field 132 having sufficient extent to enable the scanning of the corresponding laser beam 118a, 118b, 118c, 118d across the entire surface of the powder bed 104 (so called "full field" and as shown in FIG. 16a). In such a case, each (or the at least one) optical scanner 106a, 106b, 106c, 106d scans all of the spheres 113 on the calibration artefact 114. However, in another embodiment, the scan fields 132 do not cover the entire powder bed 104, the scan fields only partially overlapping within the area of the powder bed surface. This is shown in FIG. 4. In such an embodiment, each laser scanner 106a, 106b, 106c, 106d would scan its corresponding laser beam 118a, 118b, 118c, 118d over only a subset of the spheres 113.

The system records a demand signal (such as a demand position) that causes the optical scanner 106 to direct the laser beam 118 to the known reference position of the centre of the sphere 113.

The calibration artefact 114 is then moved to the second position, in this embodiment by rotating the calibration artefact to locate the artefact on the other set of mounting formations 148a, 148b, 148c. The calibration artefact 114 is arranged such that the movement to the second position from the first position locates the calibration elements 113 in a new set of known reference positions different to the set of known reference positions provided by the first position of the calibration artefact 114 on the build platform 102. For example, the new known reference positions may be substantially half-way between the previous known reference positions when the calibration artefact is in the first position. For example, the movement may relocate spheres 113 to the locations indicated by the crosses in FIG. 10.

In this new position, measurements are carried out for the new known reference positions of the spheres 113 as described above to determine demand signals for the new locations. Movement of the calibration artefact 114 increases the density of locations across the working plane 110 for which deviations are determined.

In other embodiments, the calibration artefact 114 is arranged to be movable to further positions to provide an even higher density of deviation measurements across the working plane 110.

In a further embodiment, the calibration artefact 114 is and/or can only be located in one position on the build platform 102 and deviation measurements are obtained for this single position.

From the measurements obtained for the or each position of the calibration artefact, a calibration map, such as an error function or look-up table, can be determined associating demand positions with the known reference positions in the working plane 110. Interpolation can be used to determine associations for positions between the measured. known reference positions.

The calibration map is used by the controller to modify the demand signals sent to the optical scanner 106 during a build such that the laser beam 118 is directed towards the desired location in the working plane 110.

As all of the optical scanners 106a, 106b, 160c, 106d are calibrated to the same known reference positions of the calibration elements 113, the calibration method also aligns the optical scanners 106a, 106b, 160c, 106d with respect to each other.

The calibration artefact 114 can also be used to validate the calibration of the optical scanners 106a, 106b, 106c, 106d before and/or between builds. For example, a similar routine may be carried out as described above and the apparatus may generate an alert if a deviation between a demand position (as calculated using the calibration map) and the known reference position differs by an amount above a predetermined threshold. The kinematic mount enables the calibration artefact 114 to be returned to the same position for the validation as it was in during the initial calibration. In response to the alert, a new calibration map may be generated.

Figure 7:
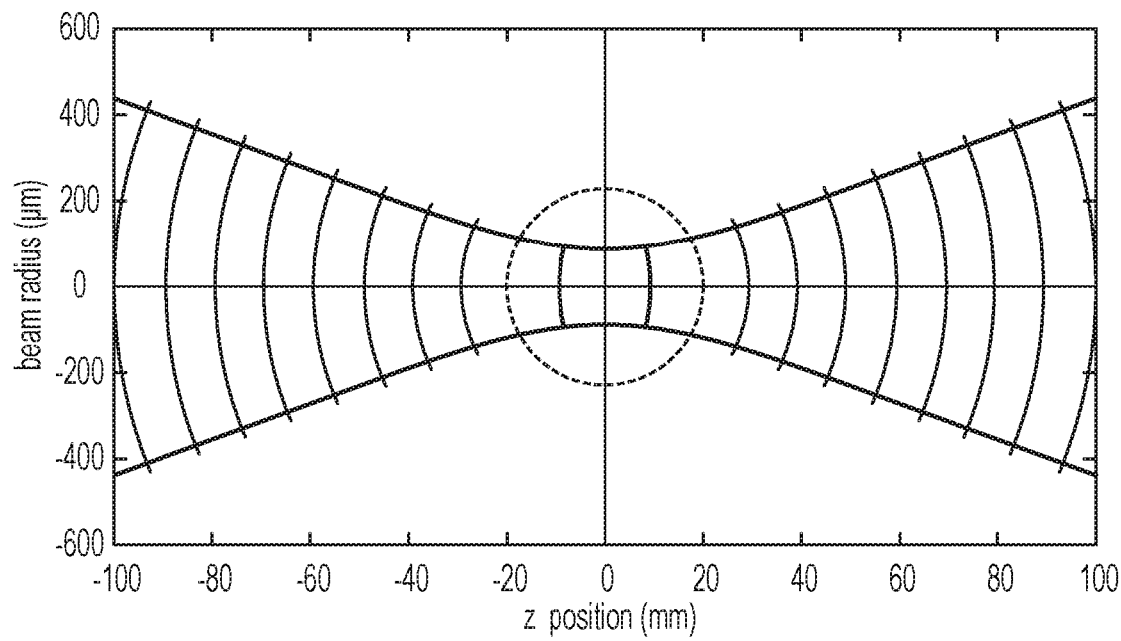
FIG. 7 illustrates the wave front curvature of the laser beam with distance from focus.
Figure 8:
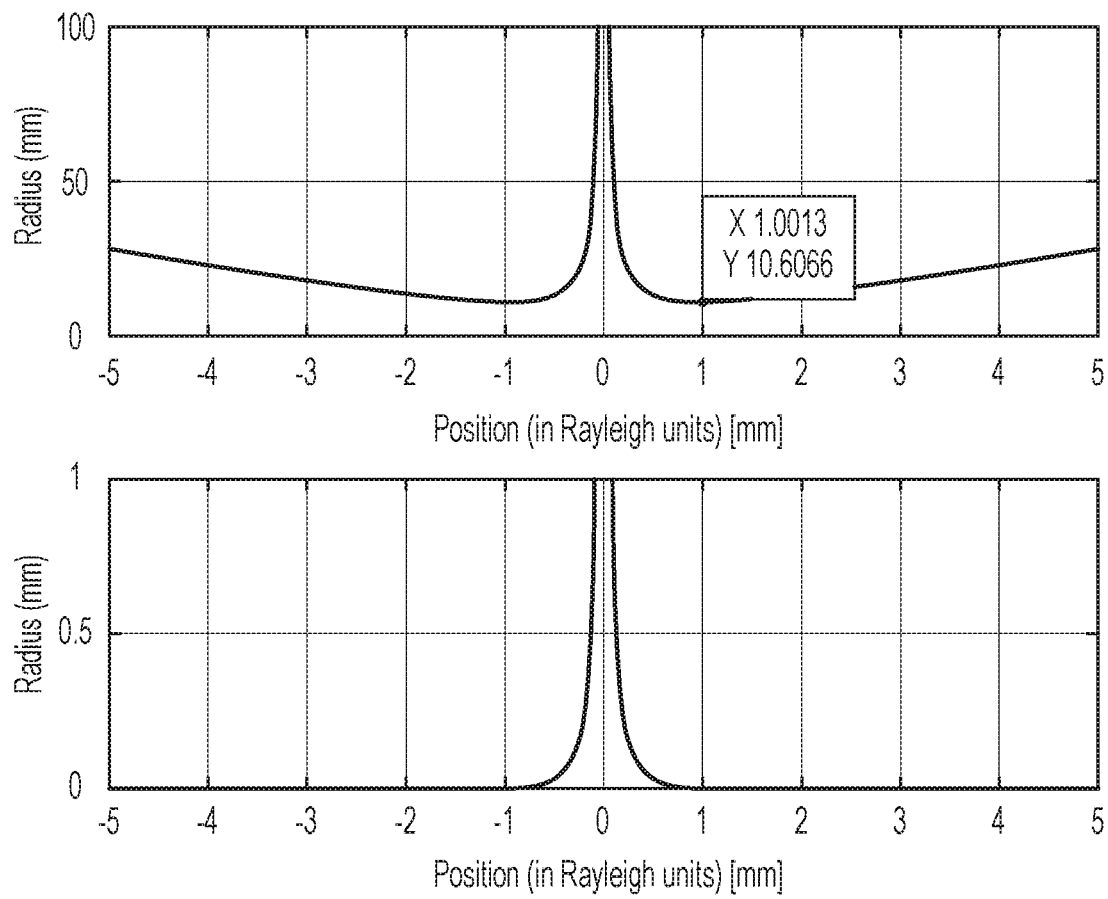
FIG. 8 is a graph illustrating how radius of curvature of the wavefronts of the laser beam changes with distance from focus.

The size of the spheres 111, 112, 113 is selected such that a curvature of the sphere's surface substantially matches the curvature of the wave-front of the focused laser beam 118 at the point of contact with the sphere 111, 112, 113. This is illustrated in FIGS. 7 and 8. At focus (where the centre of the ball is located) the wave-fronts of the focused laser beam 118 act as a plane wave and the radius of curvature is infinite. However, as illustrated in FIG. 7, as one moves away from focus, the wave-fronts become curved before quickly becoming planar. Accordingly, to obtain adequate reflection of the laser beam 118 close to but away from focus, it is desirable that the spherical surface of the calibration element 113 substantially corresponds to the curvature of the wave-front at that point. The inflexion point (as can be seen in FIG. 8) represents the smallest possible sphere radius. Referring to equation (1) above, it is believed that a spherical surface having a radius of curvature between zR and 4zR will reflect the laser beam 118 adequately.

Figure 9:
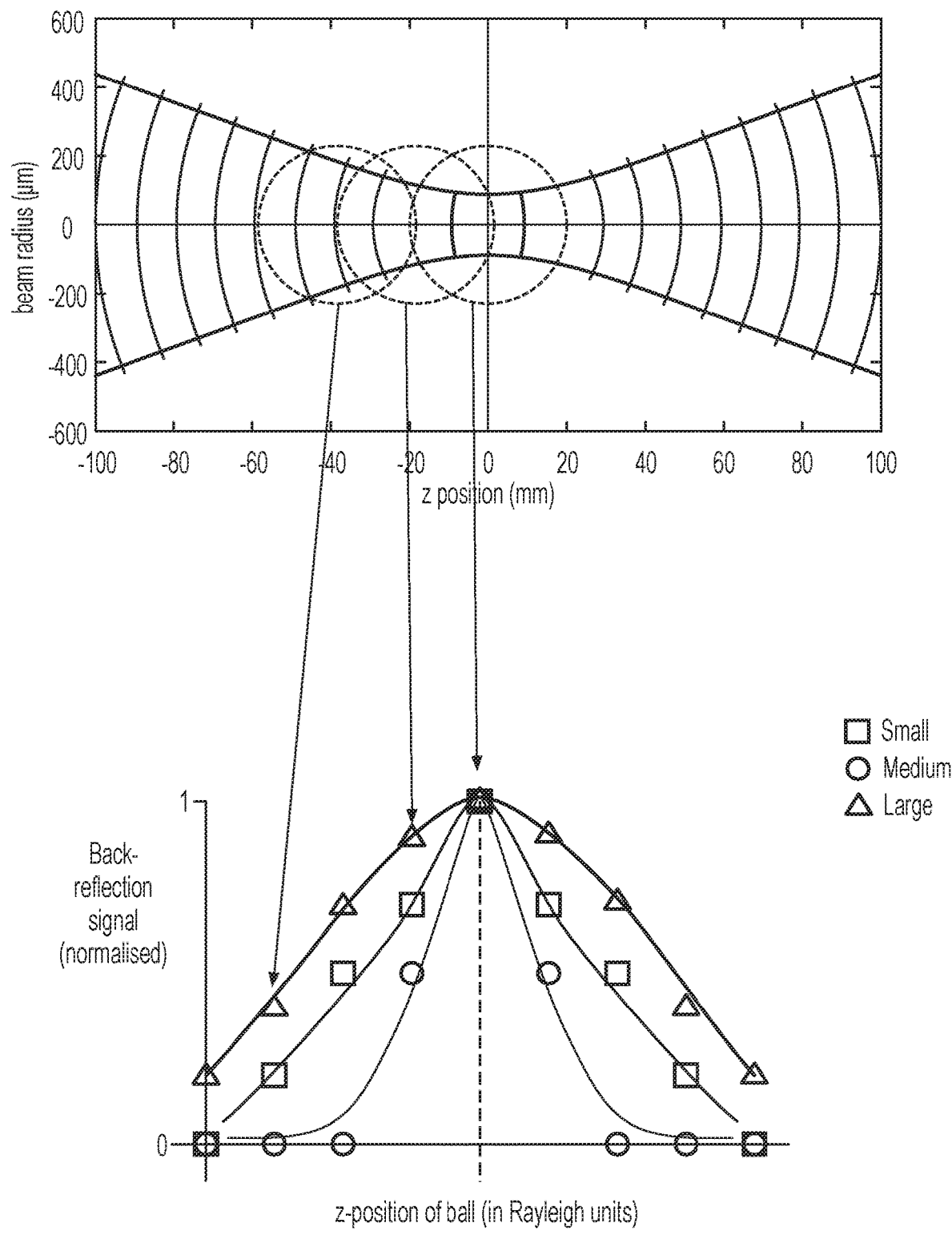
FIG. 9 is a graph illustrating how an intensity of the signals at normal incidence varies with position of the sphere for spheres of different radii.

FIG. 9 illustrates how the intensity of the back-reflected signal reduces as a centre of the sphere is moved away from the focal position of the laser beam 118 for different sized spheres. As can be seen, a smaller sized sphere gives a sharper peak (which may be good for accurately determining when the laser beam 118 is directed at a centre of the sphere using the photodetector 131) but, as a consequence, a drop-off in the signal with position of the sphere is very steep compared to a larger sphere. Accordingly, the use of a smaller sphere 113 places tighter tolerances on the accurate placement of the sphere 113 on the carrier plate 119 (in the example, the FWHM is approximately 2 mm for a 12 mm diameter ball and approximately 6 mm for a 16 mm diameter ball). Accordingly, selection of a size of the spheres should take into account these two competing requirements.

Larger balls also benefit from the larger spot size on the surface and therefore the lower fluence at the surface. This helps to prevent damage to the ball. Laser parameters can be changed to avoid damage to the surface if the fluence would otherwise be too great.

During a build the positioning the laser beam 118 by the corresponding optical scanner 106a, 106b, 106c, 106d may drift, for example due to heating of components of the apparatus. The calibration of the optical scanners 106a, 106b, 106c, 106d can be checked and adjusted during the build by each scanner 106a, 106b, 106c, 106d scanning datum elements 111, 112. The number of datum elements 111, 112 is such that each optical scanner 106a, 106b, 106c, 106d can scan at least one datum elements 111, 112 and preferably more than one datum element 111, 112 to enable yaw, pitch, roll and translation of the calibration plane to be determined.

Periodically during the build, for example after a set number of layers have been completed, each optical scanner 106a, 106b, 106c, 106d is caused to scan each datum element 111, 112 that is within its scan field 132 using, for example the scan patterns as shown in FIG. 17. When scanning the datum elements 111, 112 a focus of the laser beam is adjusted from the normal maintenance of the laser focus in the working plane 110 to take account of the positioning of the centres of the datum elements 111, 112 out of the working plane 110. It is determined whether the corrected demand position that causes the laser beam 118 to be directed at the centre of the sphere 111, 112 differs from the expected demand position. If it does, it is determined that the optical scanner 106 has drifted during the build from its calibrated position.

The apparatus may simply generate an alert if the drift detected during the build is outside a predetermined acceptable threshold.

Alternatively, the apparatus may determine a correction to adjust the positioning of the laser beam 118 by the optical scanner 106 for the drift that has occurred during the build. The correction may make an adjustment for a determined yaw, pitch, roll and translation of the calibration plane of the optical scanner 106 determined from the measured deviations.

Scanning the datum elements 111, 112 will provide information on whether the calibration planes of the optical scanners 106 have drifted during the build but the laser beams 118a, 118d, 118c, 118d can still be misaligned at the working plane 110 if a location of the working plane 110 shifts during the build. For example, the location of the working plane 110 could shift during the build because of a change in the location of the lower edge of the recoater 109, for example due to wear, inaccuracies in the movement of the build platform 102 and/or thermal expansion of the build platform 102, drive mechanism 133 that controls movement of the build platform 102 and/or the recoater 109. Information from the scanning the of the datum elements 111, 112 can be used in conjunction with information from the PSDs 123 to determine whether the working plane 110 has shifted.

Figure 21:
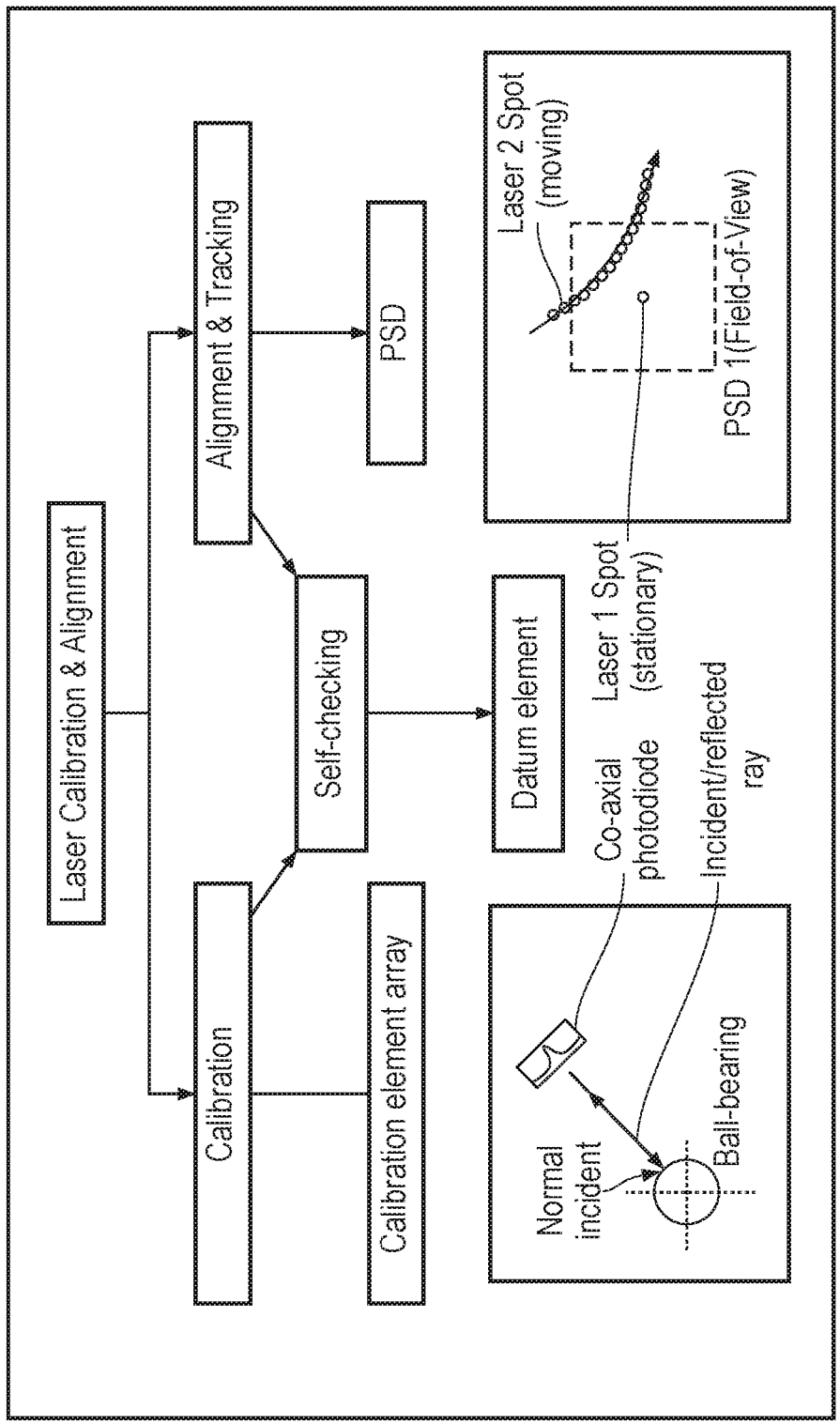
FIG. 21 is a flow diagram illustrating a method of calibrating and tracking alignment of a calibration plane of an optical scanner according to an embodiment of the invention.

The left-hand side of FIG. 21 refers to the calibration method described above and is carried out before the build begins. During the build, signals from the PSD 123 are recorded at least when another of the laser beams 118a, 118b, 118c, 118d are in the field of the view of the PSD 123 of the optical scanner 106a, 106b, 106c. 106d. This is shown in the box in the right-hand corner of FIG. 21. In this example, a laser beam spot of the optical scanner 106a, 106b, 106c, 106d (denoted laser 1 spot) is centred and stationary within the field of view of the PSD of that scanner 106. A laser beam spot of another one of the optical scanners 106a, 106b, 106c, 106d (denoted laser 2 spot) is shown traversing the field of view. In this embodiment, the laser beams are scanned across the powder bed 104 using a point scanning strategy, wherein a scan path is traversed by the laser in a series of exposed points spaced apart by a point distance. PSD data may be collected when the corresponding laser beam of the optical scanner is switched off during a "jump" between point exposures. During this time, the PSD 123 can pick up the position of another laser beam (such as laser 2 spot) within the field of view.

The path which a laser spot of the other beam takes in crossing the field of view will depend on the relative movement between the laser 1 spot and the laser 2 spot (the field of the view moving together with the laser 1 spot). FIG. 21 shows an example of the laser 2 spot travelling through the field of view along an arc path made up of a series of point exposures. The firing to the lasers 105 that form laser 1 spot and laser 2 spot and the steering of the laser beams 118 by the optical scanners 106 is synchronised such that there are times when each laser is firing and the other laser is not and the timing of the relative movement between the laser1 spot and the laser 2 spot is known. For example, a deterministic control system, such as disclosed in WO2017/085469, which is incorporated herein in its entirety by reference, is used to synchronise the firing and movement of the lasers.

From the PSD data, a difference is determined, if any, between a measured position of laser 2 spot in the field of view and an expected position of the laser 2 spot within the field of view. The expected position is determined from the pre-planned paths to be taken by the laser spots on the working plane 110 and the known timing at which the laser beams traverse these paths. Any difference between the measured and expected positions is recorded as a misalignment of the calibration planes of the corresponding scanners 106.

Such a misalignment could be caused by relative movement between the optical scanners (and therefore, the relative positions of the calibration planes of the optical scanners 106) and/or relative movement between the calibration planes and the working plane 110. To correct for a relative misalignment of the calibration planes, a correction transformation is determined to realign the calibration planes. If the calibration planes remain aligned but the working plane 110 has moved, then action may be taken to realign the working plane 110 with the calibration planes. The location of the working plane 110 may be altered by an adjustment of a position of the build platform 102 after a powder layer has been spread by the recoater 109 or an adjustment of a vertical position of the recoater 109.

In a further embodiment, if the working plane 110 is deemed to have moved by an amount above a predetermined threshold, an alert may be generated, allowing the user to decide on what action to take, such as to replace a wiper blade of the recoater 109 and/or to stop the build.

Data obtained from scanning the datum elements 111, 112 can be used to distinguish between the causes of the misalignment. For example, if, when scanning each datum element 111, 112, the demand position that causes the laser beam 118 to be directed at the centre of the ball remains unchanged (within an expected margin of error) from an initial calibration, then it can be concluded that a position of the calibration plane of the optical scanner remains unchanged and that the misalignment detected at the working plane 110 is due to movement of the working plane 110. If the demand position that causes the laser beam 118 to be directed at the centre of the ball has changed (falls outside an expected margin of error), then it can be concluded that a position of the calibration plane has changed (for example, because of movement of the optical scanner 106 due to thermal expansion/contraction of parts of the apparatus) and a correction to the demand positions is determined for the measured shift in the position of the calibration plane. For example, for a sufficient number of datum elements 111, 112 yaw, pitch, roll and translation of the calibration plane to be determined.

To enable the calibration and the in-build check, the photodetector 131, 123 signals must be associated with a position in the working plane 110 with sufficient accuracy, for example within 30 micrometres and preferably within 10 micrometres. To achieve this, the photodetector signals are associated with demand positions of demand signals sent to the relevant scanner 106. However, due to delays in the transmission of the signals between the controller 140 and the photodetectors 123, 131 there may be a delay (so called "pipeline delay") between the controller 140 sending the demand signal to the optical scanner 106 and the controller 140 receiving the photodetector signals. The pipeline delay is predetermined.

In accordance with one embodiment, to determine the pipeline delay, a reference element 111, 112, 113 is scanned by the corresponding laser beam 118a, 118b, 118c, 118d of each scanner 106a, 106b, 106c, 106d. For each one of a candidate set of pipeline delays, each photodetector 131 signal recorded during the scan of the reference element 111, 112, 113 is associated with a coordinate position defined by a demand position signal issued to the optical scanner 106 by the controller 140 at an earlier time as given by the candidate signal delay. A geometrical property of a resultant representation of the reference element formed from the photodetector signals is determined. In this embodiment, the geometrical property is a major and minor axis of the representation of the reference element 111, 112, 113. The geometrical property of the reference artefact 111, 112, 113 is known. For example, for a ball, it is known that a 2-dimensional representation of the artefact should produce a circle in which the major and minor axis are the same. The actual signal delay is determined to be the candidate signal delay that most closely reproduces the known geometrical property.

Referring to FIGS. 19a to 19c, three representations are shown of a reference element using the same sets of photodetector data and demand position data but different pipeline delays. As can be seen, changing the pipeline delay alters a shape of the reference element in the representations. FIG. 20 is a graph plotting the size of the major and minor axis measured from the representations of the reference element for different pipeline delays. The measured size of the major and minor axis can be seen to substantially coincide at a pipeline delay of about 420 microseconds. A pipeline delay determined in this manner can then be applied to the photodetector signals for photodetectors 123 and 131 when calibrating and checking the calibration of the apparatus.

The method may also comprise characterising the or each laser beam 118a, 118b, 118c, 118d using one or more of the reference elements 111, 112, 113. For example, the reference elements may be used to characterise the focus and divergence of each laser beam 118a, 118b, 118c, 118d. In one embodiment, for one or a plurality of the reference elements 111, 112, 113, 513, the optical scanner 106 directs the laser beam such that the laser beam is normal to the spherical surface of the reference element 111, 112, 113, 513 and then varies the focal length of the laser beam using the movable focusing optics 120. For a plurality of the positions of the focusing optics 120, photodetector signals are recorded from photodetector 131. Plotting intensity of the reflected electromagnetic radiation against focal length will give a curve like that shown in FIG. 8, with the peak coinciding with the focus being located at a centre defined by the spherical surface.

Modifications and alterations may be made to the above described embodiments without departing from the invention as defined herein. For example, rather than using the detected back-reflected laser light to calibrate the optical scanners, the apparatus may use the electromagnetic radiation detected by the photodetectors 123. Furthermore, rather than use the processing laser beams 118a, 118b, 118c, 118d to calibrate the optical scanners 106a, 106b, 106c, 106d, a different laser beam can be introduced into the optical path so as to be coaxial with the processing laser beam. For example, an alignment laser beam may be used for the calibration process.

The apparatus may comprise one or more scanners movable relative to the working plane, for example a plurality of scanners mounted on a movable "print-head" unit, such as described in WO2014/199149, which is incorporated herein in its entirety by reference. For such an apparatus, the calibration and/or checking process may be carried out at each of a plurality of locations of the optical scanner relative to the working plane 110. For example, the datum elements may be used to determine if the calibration plane of the optical scanner has shifted as the optical scanner is translated relative to the working plane and a suitable correction applied to the demand signals.

Rather than raster scanning the reference elements 111, 112, 113, a different scanning operation may be used, for example an active path optimisation routine in which the path is modified based upon feedback from the photodetector 131 in a search for the point of peak intensity. In a further embodiment, curved paths, such as circular or spiral paths, which gradually build up over the surface of the reference element may be used rather than a raster scan.

In a further embodiment, the datum elements 111, 112 may be used in a routine to align scanners that have been independently calibrated, rather than all calibrated to a common calibration artefact. For example, scanners calibrated using the conventional technique as described in WO94/15265. In such an embodiment, the datum elements 111, 112, for example located within regions in which the scan fields of two or more scanners overlap, are used as cardinal points for a coarse alignment of the calibration planes of the optical scanners 106a, 106b, 106c, 106d and then the PSDs 123 are used to provide a fine adjustment to this alignment.

The array of balls 113 on the calibration artefact may comprise a different arrangement and/or density of balls 112. For example, the non-linearity of the galvanometers that move the movable mirrors 141a, 141b may be solved using two transverse, such as perpendicular, lines of balls having a sufficiently high density, as described above. A lower density of balls 112 can then be used across the rest of the calibration artefact to solve for the alignment of the calibration plane with the working plane 110.

Rather than or in addition to the mounting formations 147, 148 that enable the calibration artefact to be mounted in two or more positions on the build platform 102, the calibration artefact may be arranged to be indexed between two or more positions to change the position of the calibration elements 113.

The datum elements 111, 112 may be embedded within a surface the processing plate 115 or other surface that can be exposed to the laser beams 118a, 118b, 118c, 118d, rather than being mounted on or above the surface.

The reference elements may be arranged to fluoresce when a laser beam irradiates a centre of the reference element. In such an embodiment, an off-axis photodetector, such as a photodetector in the build chamber, which integrates all incoming light may be used for detecting the electromagnetic radiation when the reference elements fluoresce. Correlating demand positions of the scanners at the time fluorescence is detected to the position of the reference elements enables the scanners to be checked and/or calibrated.

In a further embodiment, the reference elements may comprise retroreflectors (such as corner cubes or spherical reflector) and each scanner is controlled to scan the corresponding laser beam along at least one hatch line through a centre of the retroreflector, and preferably a plurality of hatch lines. This may comprise raster scanning the laser beam across the retroreflector. A centre of the retroreflector is then determined by finding a midpoint of the hatch line(s) for which back-reflection of the laser beam occurs.

The invention claimed is:

1. A method of determining an alignment of an optical scanner for directing an electromagnetic beam to locations within a scan field, the method comprising:
    locating a reference element within the scan field of the optical scanner;
    controlling the optical scanner to cause the electromagnetic beam to be directed to a plurality of different points in the scan field, including at least one point on the reference element;
    detecting reflected electromagnetic radiation;
    determining when the electromagnetic beam is directed to a reference position in the scan field given by the reference element from a comparison of an intensity of the detected electromagnetic radiation for the different points; and
    determining a corresponding demand signal that causes the optical scanner to direct the electromagnetic beam to the reference position,
    wherein the reference element comprises a reflective surface irradiated by the electromagnetic radiation and arranged such that, if the electromagnetic beam hits the reflective surface away from normal incidence, the electromagnetic beam is reflected away from the optical scanner and an intensity of detected reflected radiation is relatively small compared to an intensity of detected reflected radiation when the electromagnetic beam is at normal incidence to the reflective surface.

2. The method according to claim 1, wherein the reference element comprises a reflective surface irradiated by the electromagnetic radiation has a shape such that an amount of light retroreflected is dependent on an angle of incidence of the electromagnetic beam to the reflective surface.

3. The method according to claim 2, wherein the reflective surface is a convex surface.

4. The method according to claim 1, comprising determining when the electromagnetic beam is directed to the reference position from when an intensity of the detected electromagnetic radiation is at a maxima.

5. The method according to claim 1, comprising determining when the electromagnetic beam is directed to the reference position from when the electromagnetic beam is at the normal incidence to the reflective surface.

6. The method according to claim 1, wherein the reflective surface comprises a circular or spherical surface such that when the electromagnetic beam is directed at a centre of a circle or sphere, as defined by the circular or spherical surface, the electromagnetic beam is at normal incidence to the circular or spherical surface.

7. The method according to claim 6, wherein a radius of curvature of the circular or spherical surface is between $z_R$ and $4z_R$, wherein $z_R$ is the Rayleigh length of the electromagnetic beam.

8. The method according to claim 6, wherein the reference position is a location of the centre of the circle or sphere.

9. The method according to claim 6, wherein the centre of the circle or sphere lies in a working plane.

10. The method according to claim 6, wherein, when the electromagnetic beam is directed at the centre of the circle or sphere, the greatest proportion of the electromagnetic radiation is retroreflected back along a path of the electromagnetic beam.

11. The method according to claim 1, wherein the reference element is opaque to the electromagnetic radiation.

12. The method according to claim 1, wherein the reflective surface irradiated by the electromagnetic radiation provides greater than 50% specular reflection at a wavelength of the electromagnetic beam.

13. The method according to claim 1, comprising locating an array of reference elements in the scan field, the reference elements having known relative locations within a common plane.

14. The method according to claim 1,
    comprising locating a plurality of reference elements in the scan field, each reference element of the plurality of reference elements comprising a spherical surface,
    wherein centres of spheres, as defined by the spherical surfaces, lie in a common plane.

15. The method according to claim 1 carried out for a plurality of optical scanners of the same apparatus, wherein the scan fields of the optical scanners overlap and the same reference element is used for calibrating multiple ones of the plurality of optical scanners.

16. The method according to claim 1, comprising calculating a calibration map for the optical scanner from the corresponding demand signal and the reference position.

17. The method according to claim 1, comprising determining whether there is an offset between the reference position and a demand position corresponding to the corresponding demand signal.

18. A method of determining an alignment of an optical scanner for directing a laser beam to locations within a scan field in a laser-based powder bed fusion apparatus, the laser-based powder bed fusion apparatus comprising:
a fibre-laser for generating the laser beam;
the optical scanner for directing the laser beam to a plurality of locations on a powder bed for melting powder;
a photodetector for detecting light at a laser wavelength of the laser beam; and
a splitter for removing back-reflected laser light travelling backwards in a delivery fibre optic or a beam delivery optic of the fibre-laser and directing the back-reflected laser light to the photodetector, and the method comprising:
locating a reference element within the scan field of the optical scanner;
controlling the optical scanner to cause the laser beam to be directed to a plurality of different points in the scan field, including at least one point on the reference element;
detecting the back-reflected laser light with the photodetector;
determining when the laser beam is directed to a reference position in the scan field given by the reference element from a comparison of an intensity of the back-reflected laser light detected for the different points; and
determining a corresponding demand signal that causes the optical scanner to direct the laser beam to the reference position.

19. The method according to claim 18, wherein the splitter is arranged to split the back-reflected laser light travelling backwards in coating material of an optical fibre surrounding a delivery optical fibre core.

20. The method according to claim 18, wherein the splitter comprises a cladding mode stripper, which directs the back-reflected laser light in coating material to the photodetector.

21. The method according to claim 18, wherein the optical scanner comprises at least one movable optical element, and the photodetector is arranged to detect the back-reflected laser light reflected to the photodetector via the at least one movable optical element along the same path as the laser beam is delivered to the powder bed.

22. A powder bed fusion manufacturing method, comprising:

detecting, with a photodetector integrated into a fibre-laser, electromagnetic radiation emitted from a powder bed in which material is consolidated using a laser beam generated by the fibre-laser, the laser beam being directed to different positions on the powder bed by at least one movable optical element of an optical scanner; and correlating each detector signal generated by the photodetector to a position of the optical element or a demand signal which causes movement of the at least one movable optical element.

23. The powder bed fusion manufacturing method according to claim 22, comprising directing electromagnetic radiation travelling backward in the optical fibre to the photodetector.

* * * * *